(12) United States Patent
Kang et al.

(10) Patent No.: US 8,081,716 B2
(45) Date of Patent: Dec. 20, 2011

(54) DIGITAL BROADCASTING RECEIVING SYSTEM AND METHOD OF PROCESSING DATA

(75) Inventors: Kyung Won Kang, Seoul (KR); In Hwan Choi, Gyeonggi-do (KR); Jong Moon Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 968 days.

(21) Appl. No.: 11/627,315

(22) Filed: Jan. 25, 2007

(65) Prior Publication Data

US 2007/0217551 A1 Sep. 20, 2007

Related U.S. Application Data

(60) Provisional application No. 60/883,140, filed on Jan. 2, 2007.

(30) Foreign Application Priority Data

Jan. 25, 2006 (KR) .................. 10-2006-0007972
Sep. 15, 2006 (KR) .................. 10-2006-0089736

(51) Int. Cl.
*H04L 27/06* (2006.01)
*H04L 27/14* (2006.01)

(52) U.S. Cl. ............... 375/340; 375/324; 375/341

(58) Field of Classification Search ............ 375/226, 375/260, 326, 371, 373, 375, 262, 265, 324, 375/340, 341, 346; 714/784, 794, 795, 758, 789; 348/725, 726

See application file for complete search history.

(56) References Cited

U.S. PATENT DOCUMENTS

| 5,606,569 | A  | * | 2/1997 | MacDonald et al. | 714/758 |
| 5,805,619 | A  | * | 9/1998 | Gardner et al. | 714/814 |
| 6,272,660 | B1 | * | 8/2001 | Chen et al. | 714/794 |
| 2002/0085632 | A1 | | 7/2002 | Choi et al. | |
| 2002/0154709 | A1 | | 10/2002 | Choi et al. | |
| 2003/0123533 | A1 | * | 7/2003 | Zoltowski | 375/225 |
| 2003/0161393 | A1 | * | 8/2003 | Ahn | 375/224 |
| 2004/0161056 | A1 | * | 8/2004 | Jun et al. | 375/326 |
| 2005/0111586 | A1 | * | 5/2005 | Kang et al. | 375/321 |
| 2007/0288833 | A1 | * | 12/2007 | Djurdjevic et al. | 714/784 |

FOREIGN PATENT DOCUMENTS

| WO | 2005/006759 | 1/2005 |
| WO | WO 2005-071958 A1 | 8/2005 |
| WO | WO 2005-109877 A1 | 11/2005 |
| WO | WO 2005-109878 A1 | 11/2005 |
| WO | 2005/115001 | 12/2005 |

* cited by examiner

*Primary Examiner* — Young T. Tse
(74) *Attorney, Agent, or Firm* — Lee, Hong, Degerman, Kang & Waimey

(57) ABSTRACT

A digital broadcasting receiving system and method is disclosed. In the data processing method, a known data sequence is tuned so as to be received, when the known data sequence is periodically inserted in valid data and transmitted. Then, the timing error is detected by using a correlation characteristic of the received known data sequence. Thereafter, a timing clock that is in proportion to the detected timing error is created, thereby interpolating the received data.

10 Claims, 14 Drawing Sheets

DIGITAL BROADCASTING RECEIVING SYSTEM AND METHOD OF PROCESSING DATA

This application claims the benefit of the Korean Patent Application No. 10-2006-0007972, filed on Jan. 25, 2006, which is hereby incorporated by reference as if fully set forth herein. Also, this application claims the benefit of the Korean Patent Application No. 10-2006-0089736, filed on Sep. 15, 2006, which is hereby incorporated by reference as if fully set forth herein. This application also claims the benefit of U.S. Provisional Application No. 60/883,140, filed on Jan. 2, 2007, which is hereby incorporated by reference.

BACKGROUND OF THE INVENTION

1. Field of the Invention

The present invention relates to a digital telecommunications system, and more particularly, to a digital broadcasting receiving system and method that can receive and process digital broadcast programs.

2. Discussion of the Related Art

Presently, the technology for processing digital signals is being developed at a vast rate, and, as a larger number of the population uses the Internet, digital electric appliances, computers, and the Internet are being integrated. Therefore, in order to meet with the various requirements of the users, a system that can transmit diverse supplemental information in addition to video/audio data through a digital television channel needs to be developed.

Some users may assume that supplemental data broadcasting would be applied by using a PC card or a portable device having a simple in-door antenna attached thereto. However, when used indoors, the intensity of the signals may decrease due to a blockage caused by the walls or disturbance caused by approaching or proximate mobile objects. Accordingly, the quality of the received digital signals may be deteriorated due to a ghost effect and noise caused by reflected waves. However, unlike the general video/audio data, when transmitting the supplemental data, the data that is to be transmitted should have a low error ratio. More specifically, in case of the video/audio data, errors that are not perceived or acknowledged through the eyes or ears of the user can be ignored, since they do not cause any or much trouble. Conversely, in case of the supplemental data (e.g., program execution file, stock information, etc.), an error even in a single bit may cause a serious problem. Therefore, a system highly resistant to ghost effects and noise is required to be developed.

The supplemental data are generally transmitted by a time-division method through the same channel as the video/audio data. However, with the advent of digital broadcasting, digital television receiving systems that receive only video/audio data are already supplied to the market. Therefore, the supplemental data that are transmitted through the same channel as the video/audio data should not influence the conventional receiving systems that are provided in the market. In other words, this may be defined as the compatibility of broadcast system, and the supplemental data broadcast system should be compatible with the broadcast system. Herein, the supplemental data may also be referred to as enhanced data. Furthermore, in a poor channel environment, the receiving performance of the conventional receiving system may be deteriorated. More specifically, resistance to changes in channels and noise is more highly required when using portable and/or mobile receiving systems.

SUMMARY OF THE INVENTION

Accordingly, the present invention is directed to a digital broadcasting receiving system and method that substantially obviates one or more problems due to limitations and disadvantages of the related art.

An object of the present invention is to provide a digital television system that is suitable for transmitting supplemental data and that is highly resistant to noise.

A further object of the present invention is to provide a digital broadcasting receiving system and method that can insert known data in a data section of a specific domain and transmitting the data to a receiving system and/or a transmitting system, so as to use the inserted and transmitted data in demodulation and channel equalization process, thereby enhancing the receiving performance of the digital broadcast (or television) system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a data processing method of a digital receiving system includes the steps of tuning and receiving a known data sequence, when the known data sequence is periodically inserted in valid data and transmitted, detecting timing error by using a correlation characteristic of the received known data sequence, and creating a timing clock that is in proportion to the detected timing error, thereby interpolating the received data.

Herein, in the step of detecting timing error, a correlation value between the known data sequence and the received data in a time domain may be calculated, so as to detect the timing error from the correlation value, the known data being known in accordance with to an agreement between a receiving system and a transmitting system.

In another aspect of the present invention, a data processing method of a digital receiving system includes receiving a digital broadcast signal including known data, the known data being known in accordance with an agreement between a receiving system and a transmitting system, detecting a first timing error from the received signal, detecting a second timing error from the received signal, selecting any one of the first and second timing errors based upon whether or not an area having known data inserted therein exists, or integrating the first and second timing errors, thereby outputting the selected or integrated timing error(s), and creating a timing clock that is in proportion to the detected timing error, thereby interpolating the received signal.

In another aspect of the present invention, a digital receiving system includes a timing error detector, a loop filter, and an interpolator. The timing error detector detects timing error from a received signal based on known data information. The loop filter filters the timing error detected from the timing error detector. The interpolator creates a timing clock that is in proportion to the detected timing error and interpolates the received signal.

In a further aspect of the present invention, a digital receiving system includes a reception unit, a first timing error detector, a second timing error detector, a selector, and an interpolator. The reception unit receives a digital broadcast signal including known data, the known data being known in accordance with an agreement between a receiving system and a transmitting system. The first timing error detector detects a first timing error from the received signal. The second timing error detector detects a second timing error from the received signal. The selector selects any one of the first and second timing errors based upon whether or not an area having known data inserted therein exists, or integrates the first and second timing errors, thereby outputs the selected or integrated timing error(s). The interpolator creates a timing clock that is in proportion to the timing error outputted from the selector, thereby interpolates the received signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In the present invention, the enhanced data may either consist of data including information such as program execution files, stock information, and so on, or consist of video/audio data. Additionally, the known data refer to data already known based upon a predetermined agreement between the transmitting system and the receiving system. Furthermore, the main data consist of data that can be received from the conventional receiving system, wherein the main data include video/audio data. The present invention relates to multiplexing the enhanced data and the known data known already known by the transmitting system and receiving system and transmitting the multiplexed data, thereby enhancing the receiving performance of the receiving system. Also, the present invention relates to having a transmitting system regularly (or periodically) insert and transmit known data, and to having a receiving system detecting the known data regularly inserted and transmitted so as to be used in a timing clock recovery process. Thus, the receiving performance of a receiving system may be enhanced.

Figure 1:
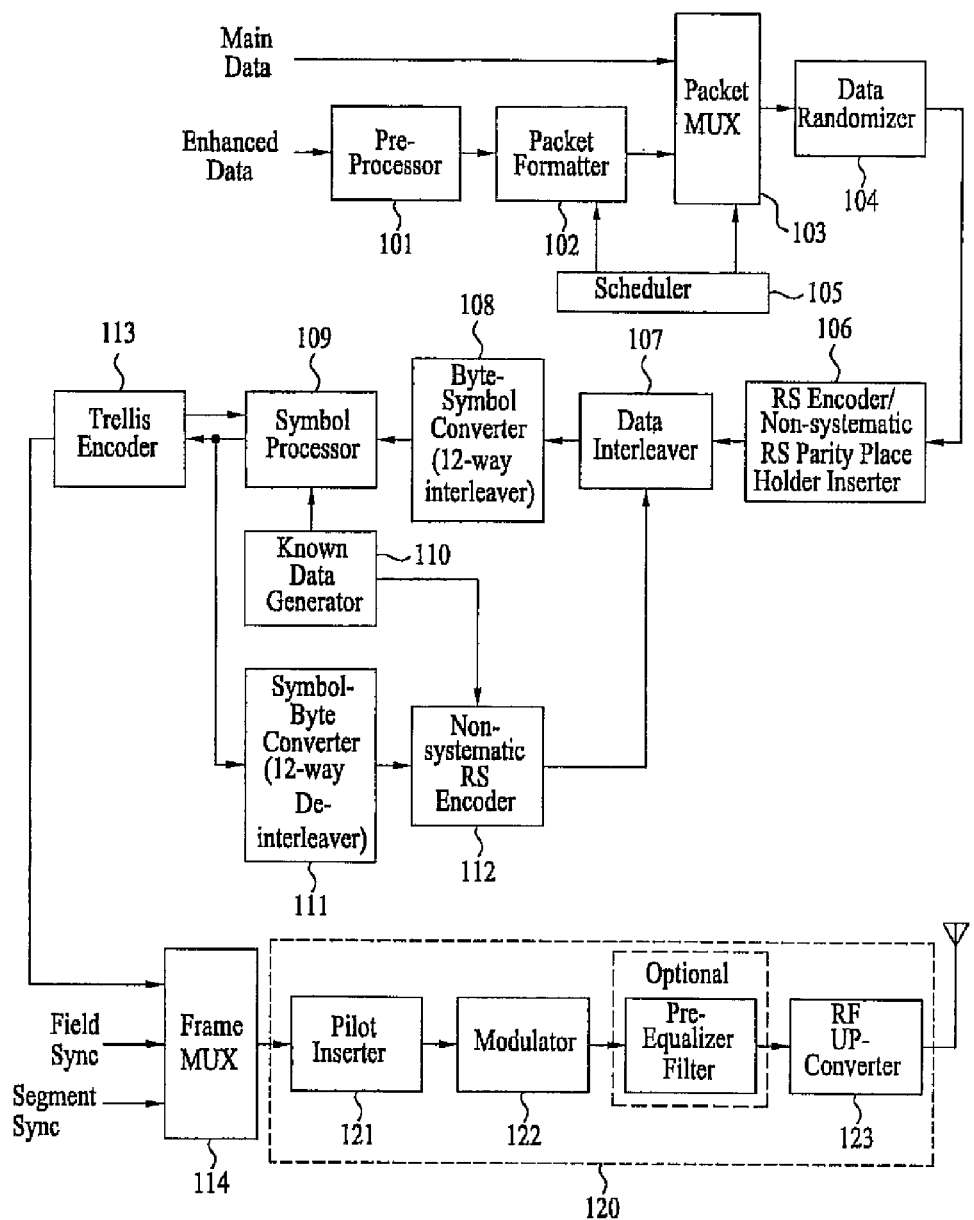
FIG. 1 illustrates a block diagram showing the structure of a digital broadcast transmitting system according to an embodiment of the present invention.

FIG. 1 illustrates a block diagram of a digital broadcast (or television) transmitting system according to the present invention, which is used for regularly inserting and transmitting known data. Herein, the digital broadcast transmitting system shown in FIG. 1 is only an example given to simplify the understanding of the present invention. Any transmitting system capable of regularly inserting and transmitting known data sequences may be applied to the present invention. Therefore, the features of the present invention are not limited only to the example given in the description of the present invention.

FIG. 1 illustrates a block diagram of a digital television transmitting system according to the present invention. The digital television transmitting system includes a pre-processor 101, a packet formatter 102, a packet multiplexer 103, a data randomizer 104, a scheduler 105, a Reed-Solomon (RS) encoder/non-systematic Reed-Solomon (RS) parity place holder inserter 106, a data interleaver 107, a byte-symbol converter 10B, an symbol processor 109, a known data generator 110, a symbol-byte converter 111, a non-systematic RS encoder 112, a trellis encoder 113, a frame multiplexer 114, and a transmitter 120. In the present invention having the above-described structure, a main data packet is outputted to the packet multiplexer 103, and enhanced data are outputted to the pre-processor 101. The pre-processor 101 pre-processes the enhanced data, such as encoding additional error correction, interleaving, and expanding bytes by inserting null data, and then outputs the pre-processed enhanced data to the packet formatter 102.

Based upon the control of the scheduler 105, the packet formatter 102 multiplexes the pre-processed enhanced data and the known data place holder having the null data inserted therein, thereby configuring a group. The data within the group are then divided into 184-byte unit enhanced data packets, and a 4-byte MPEG header is added to the beginning of the enhanced data packet, thereby outputting a 188-byte enhanced data packet (i.e., a MPEG compatibility packet). Herein, when the receiving system (or receiver) receives the known data, the packet formatter 102 decides a known data place holder based on the control of the scheduler 105, so that the known data sequence may be periodically inserted in the data frame and received accordingly.

The output of the packet formatter 102 is inputted to the packet multiplexer 103. The packet multiplexer 103 time-division multiplexes the main data packet and the enhanced data packet group in transport stream (TS) packet units and outputs the multiplexed TS packet in accordance with the control of the scheduler 105. More specifically, the scheduler 105 generates and outputs a control signal so that the packet formatter 102 can multiplex the main data packet and the enhanced data packet group. Accordingly, the packet multiplexer 103 receives the control signal, thereby multiplexing and outputting the main data packet and the enhanced data packet group to TS packet units.

The output data of the packet multiplexer 103 are inputted to the data randomizer 104. The data randomizer 104 discards (or deletes) the MPEG synchronization byte and randomizes the remaining 187 bytes by using a pseudo-random byte, which is generated from inside the data randomizer 104. Thereafter, the randomized data are outputted to the Reed-Solomon (RS) encoder/non-systematic RS parity place holder inserter 106. The RS encoder/non-systematic RS parity place holder inserter 106 processes the randomized data with either a systematic RS-coding process or a non-systematic RS parity place holder insertion process.

The output of the RS encoder/non-systematic RS parity place holder inserter 106 is outputted to the data interleaver 107. The data interleaver 107 then interleaves and outputs the received data. At this point, the data interleaver 107 receives the RS parity byte being newly calculated and outputted from the non-systematic RS encoder 112. Thereafter, the newly calculated and received RS parity byte replaces the non-systematic RS parity place holder that is not yet outputted. The one byte being outputted from the data interleaver 107 is converted into 4 symbols by the byte-symbol converter 108 and then outputted to the symbol processor 109. Herein, one symbol is configured of 2 bits.

The known data generated from the known data generator 110 are also outputted to the symbol processor 109. At this point, the known data correspond to the known data symbols generated in the symbol domain. Since the known data are used in the symbol domain of the receiving system, it is more effective to create (or generate) a symbol sequence of the known data having the characteristics required by the symbol domain in the transmitting system as well. Meanwhile, when the data being inputted to the symbol processor 109 correspond to the known data place holder converted into symbols by the byte-symbol converter 10B, the symbol processor 109 uses the known data generated from the known data generator 110 instead of the known data place holder. The symbol processor 109 then generates a known data symbol at the beginning of the known data sequence so that the memory of the trellis encoder 113 is initialized to a pre-decided state. In order to do so, the memory value within the trellis encoder 113 should be inputted to the symbol processor 109.

Further, the memory value of the trellis encoder 113 may also be used in an additional signaling process for the enhanced data symbol. Additionally, the trellis encoder 113 is initialized at the beginning of the known data sequence because a plurality of output sequences may be generated depending upon the memory state of the trellis encoder 113 even when the known data sequence is inputted to the trellis encoder 113. Accordingly, the memory state of the trellis encoder 113 is first initialized to a pre-decided value and, then, when the known data are inputted, a desired known data output sequence may be obtained from the output of the trellis encoder 113. The output symbol of the symbol processor 109 is inputted to the trellis encoder 113 so as to be trellis-encoded.

The trellis encoder 113 pre-codes the data that are inputted as the upper bit among the output symbols of the symbol processor 109, and trellis-encodes the data that are inputted as the lower bit. Thereafter, the pre-coded data and the trellis-encoded data are outputted to the frame multiplexer 114. Meanwhile, the symbol processor 109 receives the 2-bit symbol, processes the received symbol with a plurality of process steps, and outputs the processed symbol. Therefore, the symbol should be converted back to bytes from the symbol-byte converter 111 so that the non-systematic RS encoder 112 can recalculate the RS parity from the output of the symbol processor 109. In other words, the input symbol is converted to byte units from the symbol-byte converter 111 and outputted to the non-systematic RS encoder 112. The non-systematic RS encoder 112 calculates the 20-byte RS parity for the data packet configured of 187 information bytes and outputs the calculated RS parity to the data interleaver 107. The data interleaver 107 receives the RS parity byte calculated and outputted from the non-systematic RS encoder 112 and replaces the non-systematic place holder that is not yet outputted with the received RS parity byte.

Herein, since the enhanced data symbol and the known data place holder are changed to different values by the symbol processor 109, a decoding error occurs when performing a RS decoding process in the conventional receiving system. In other words, this is to provide backward compatibility with the conventional receiving system. Meanwhile, the non-systematic RS encoder 112 receives the output of the known data generator 110 so that the symbol-byte converter 111 can receive in advance the known data being outputted later than the RS parity byte.

The frame multiplexer 114 inserts 4 segment synchronization symbols in each output symbol of the trellis encoder 113, thereby configuring a data segment having 832 data symbols. More specifically, one field synchronization segment is inserted in each of the 312 data segments, so as to configure one data field, which is then outputted to the transmitter 120. The transmitter 120 inserts a pilot signal in the output of the frame multiplexer 114, the output having a segment synchronization signal and a field synchronization signal inserted therein. The transmitter 120 then modulates the pilot signal inserted data and converts the modulated data to an RF signal, which is transmitted through the antenna. Accordingly, the transmitter 120 includes a pilot inserter 121, a modulator 122, and a RF-UP converter 123. Furthermore, a pre-equalizer filter may be optionally included.

Figure 2:
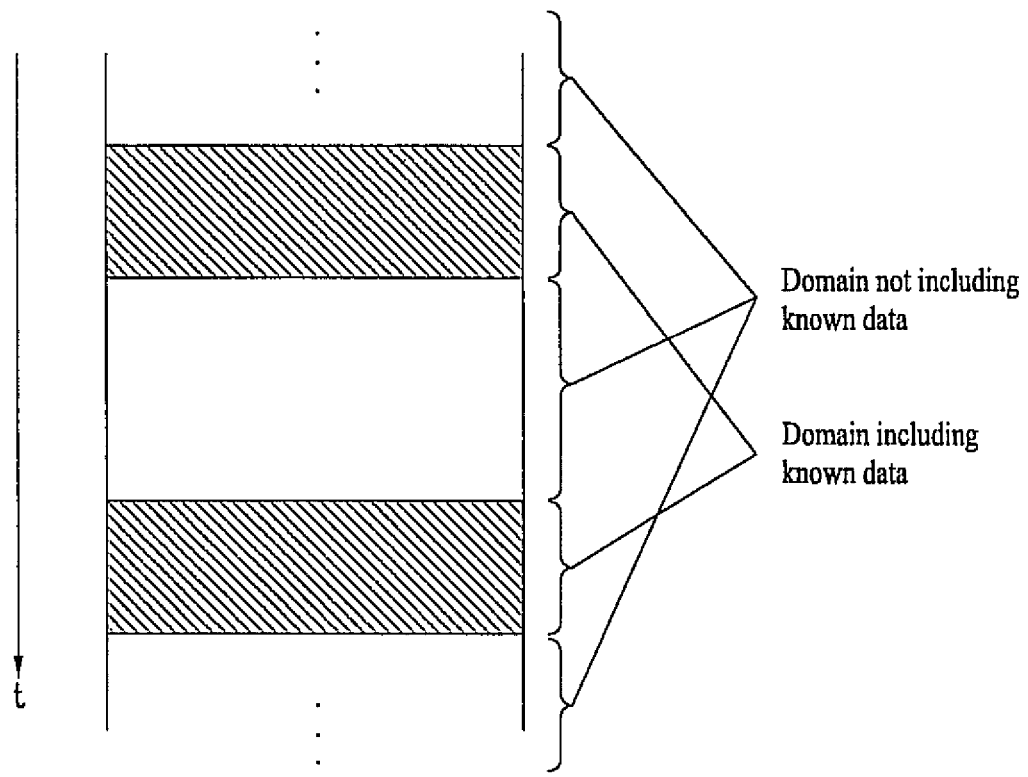
FIG. 2 illustrates an example of a data transmission pattern according to an embodiment of the present invention.

In the above-described digital broadcast transmitting system, the data may be transmitting in separate domains, as shown in FIG. 2, such as a domain in which known data having a pre-determined length are inserted and a domain in which known data are not inserted. At this point, in the digital broadcast receiving system receiving such data, demodulating and equalizing processes may be performed in the domain in which the known data are not inserted by using the same method as the conventional receiving system. Alternatively, in the domain in which known data having a pre-determined length are inserted, demodulating and equalizing processes may be performed by using the known data.

Figure 3:
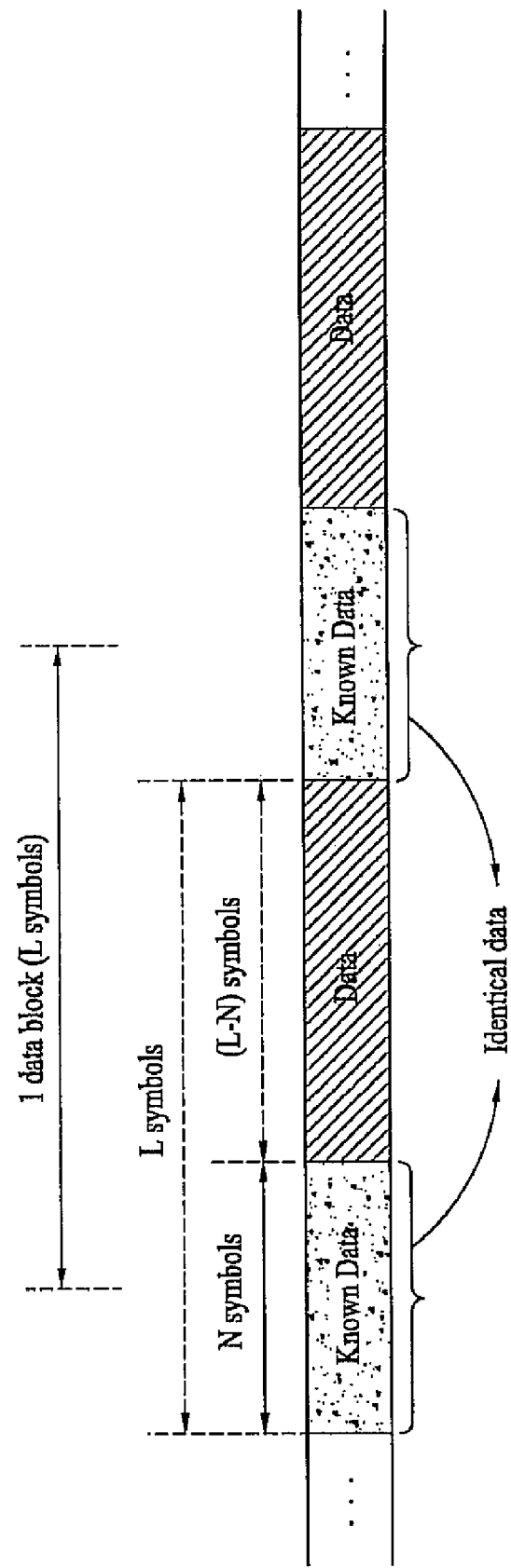
FIG. 3 illustrates an example of a data transmission pattern according to another embodiment of the present invention.

Furthermore, in the digital broadcast transmitting system, known data may be periodically (or regularly) inserted in the data frame, as shown in FIG. 3. More specifically, when transmitting the data, the digital broadcast transmitting system may insert known data in the data. At this point, the known data may be repeatedly inserted at constant intervals (or periods) and transmitted. FIG. 3 illustrates an exemplary data structure of a broadcasting signal having known data sequences with the same patterns periodically inserted between actual data by the digital broadcast transmitting system. Referring to FIG. 3, a data structure is configured to have N number of known data symbols be repeated in L number of symbol cycles and, then, transmitted. As shown in FIG. 3, the data indicated as a (L-N) symbol may correspond to the enhanced data, or may correspond to the main data, or may correspond to a mixture of enhanced data and known data. In the description of the present invention, the data corresponding to the (L-N) symbol will be referred to as "valid data" in order to be differentiated from the known data.

As described above, when known data having identical patterns are periodically inserted, the receiving system may use the inserted known data as a training sequence, so as to enhance the receiving performance. For example, the equalizer included in the receiving system may use the known data to obtain an accurate decision value and also to estimate the impulse response of a channel. Moreover, the demodulator included in the receiving system may use the correlation between the known data and the received signal to stably perform the carrier recovery and timing clock recovery processes.

Meanwhile, when the data having identical known data patterns periodically inserted and being received as consecutive symbol sequences, are divided into equal block unit sizes and processed accordingly, the known data section may be used as a guard interval. The guard interval prevents interference between data blocks that may be caused by a multiple path channel. More specifically, when L number of symbols are processed as a single data block unit, as shown in FIG. 3, an example of having the front and end portions of the data block correspond to the known data sequence and having the middle portion correspond to the valid data may be considered.

In case of a signal going through a multiple path channel according to a time delay, the precedent and following data blocks largely influence the present (or current) data block. However, if the time delay is sufficiently smaller than the length of the known data sequence, the portion of the present data block being influenced by the precedent block corresponds to the beginning of the known data sequence. This portion is identical to the known data sequence located at the end portion of the present block. Similarly, the portion of the present data block being influenced by the following block corresponds to the end of the known data sequence. This portion is identical to the known data sequence located at the front portion of the present block. Therefore, when a data block is configured by repeatedly inserting identical known data sequences, the influence of the multiple path channel caused by time delay may appear to be influence occurring within the corresponding block itself. Thus, data may be processed without any interference between data blocks. Furthermore, all symbols of the known data may be used for the demodulating and equalizing processes. And, when a signal is received, the known data symbol may be influenced by the valid data due the multiple path channel caused by time delay. In this case, if the known data sequence is sufficiently long, the known data symbol being influenced by the valid data due to the channel is removed, and the domain of the known data symbol that is not influenced by the valid data may be used for the demodulating and equalizing processes, thereby enhancing the receiving performance.

Figure 4:
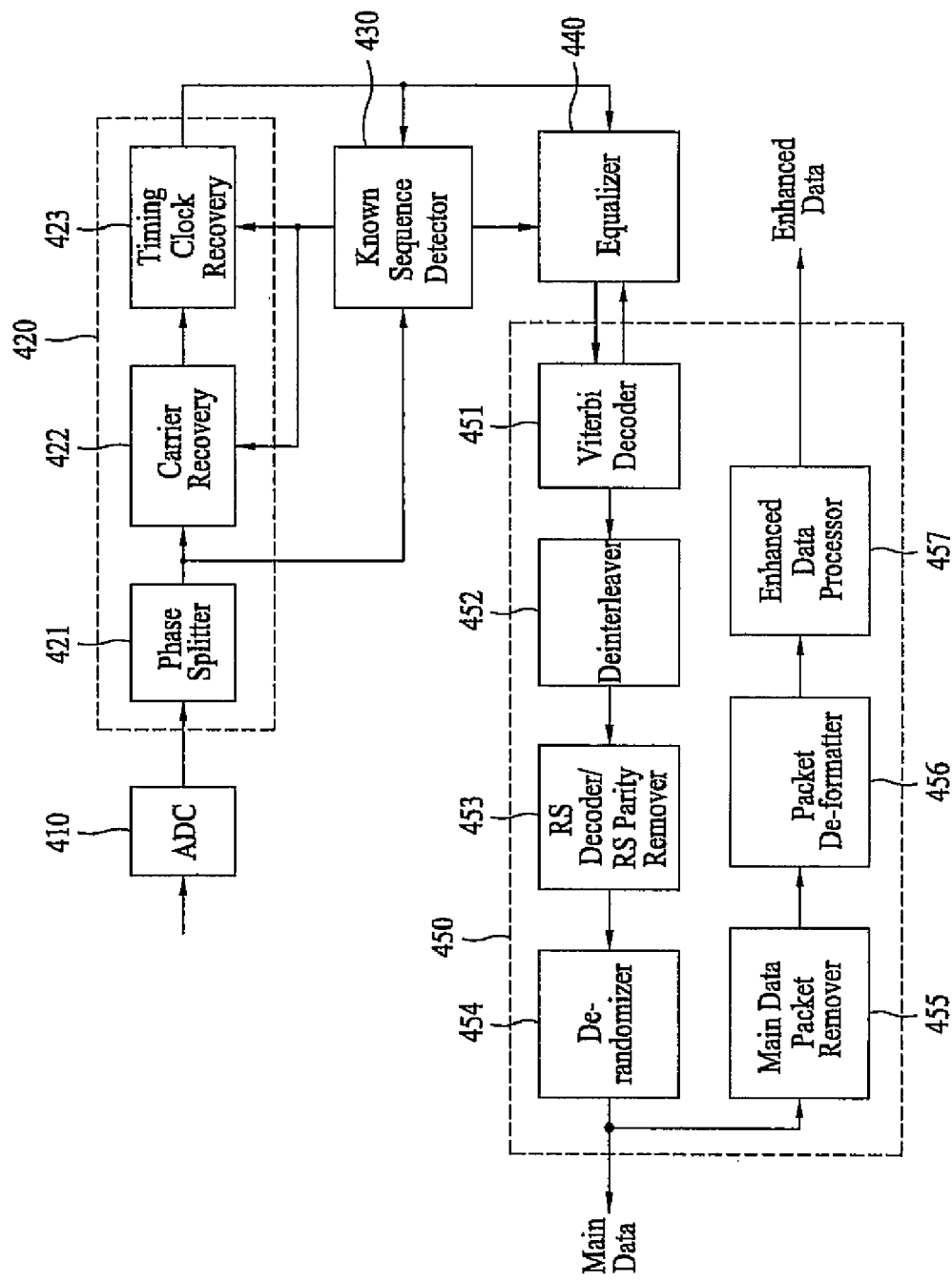
FIG. 4 illustrates a block diagram showing the structure of a digital broadcast receiving system according to an embodiment of the present invention.

FIG. 4 illustrates an example of a demodulating unit including a receiving system according to the above-described embodiment of the present invention. Referring to FIG. 4, the demodulating unit includes an analog/digital converter (ADC) 410, a demodulator 420, a known sequence detector 430, an equalizer 440, and an error correction unit 450. Herein, the demodulator 420 includes a phase splitter 421, a carrier recovery 422, and a timing clock recovery 423. Also, the error correction unit 450 includes a Viterbi decoder 451, a data deinterleaver 452, a RS decoder/non-systematic RS parity remover 453, a derandomizer 454, a main data packet remover 455, a packet deformatter 456, and an enhanced data processor 457.

More specifically, the frequency of a particular channel tuned through a tuner inputs to the A/D converter 410 in the form of an analog signal. The A/D converter 410 digitalizes the analog signal of the particular channel and outputs the digitalized signal to the phase splitter 421 of the demodulator 420. The phase splitter 421 splits the pass band digital signal into a pass band digital signal of a real number element and a pass band digital signal of an imaginary number element both having a phase of −90 degrees between one another. The split portions of the pass band digital signal are outputted to the carrier recovery 422 and the known sequence detector 430. Herein, the real number signal outputted from the phase splitter 421 will be referred to as an 'I' signal, and the imaginary number signal outputted from the phase splitter 421 will be referred to as a 'Q' signal, for simplicity of the description of the present invention.

The carrier recovery 422 changes the I and Q pass band digital signals, which are outputted from the phase splitter 421, to I and Q baseband digital signals. Then, the carrier recovery 422 outputs the I and Q baseband digital signals to the timing clock recovery 423. The timing clock recovery 423 uses the known data place information and the known data sequence, which are outputted from the known sequence detector 430, so as to estimate and compensate the carrier frequency offset with more accuracy, thereby enhancing the carrier recovery performance. The timing error recovery 422 calculates (or obtains) the timing errors of the current symbols so as to create frequencies that are in proportion to the calculated timing errors, thereby compensating for the timing errors. The output of the timing clock recovery 423 is provided to the known sequence detector 430 and the equalizer 440.

The carrier recovery process and the timing clock recovery process that are performed in the demodulator 420 may be performed sequentially, as shown in FIG. 4, or may be performed in connection with one another and not sequentially. In the demodulator 420, the carrier recovery and the timing clock recovery may be performed by using the method used in the conventional receiving system. Alternatively, if known data are included in the receiving signal, then the carrier recovery and the timing clock recovery may be performed with more stability by using the inserted known data. The timing clock recovery process using the known data will be described in detail in a later process.

The known sequence detector 430 creates (or generates) place information of the known data, which have been inserted from the transmitting system, and known data sequences of the detected known data place from the input/output data of the demodulator 420 (i.e., the output data of the phase splitter 421 or the output data of the timing clock recovery 423). The generated known data place information and the corresponding known data sequences are outputted to the carrier recovery 422 and the timing clock recovery 423 of the demodulator 420, and the equalizer 440. The equalizer 440 compensates for the distortion on the channel that is included in the demodulated signal. Then, the channel-compensated signal is outputted to the Viterbi decoder 451 of the error correction unit 450. The equalizer 440 may use the known data information in order to enhance the equalizing performance.

The Viterbi decoder 451 Viterbi-decodes the main data symbols and the enhanced data symbols, which are outputted from the equalizer 440, and then converts the symbols to bytes. The converted bytes are then outputted to the data deinterleaver 452. The 8-level decision values decided by the Viterbi decoder 451 are provided to the equalizer 440, thereby enhancing the equalizing performance. The data deinterleaver 452 performs an inverse process of the data interleaver included in the transmitting system. Thereafter, the data deinterleaver 452 outputs the deinterleaved data to the RS decoder/non-systematic RS parity remover 453. If the received data packet corresponds to the main data packet, the RS decoder/non-systematic RS parity remover 453 performs a systematic RS decoding process. Alternatively, if the received data packet corresponds to the enhanced data packet, the RS decoder/non-systematic RS parity remover 453 removes the non-systematic RS parity byte that has been inserted in the enhanced data packet. Thereafter, the RS decoder/non-systematic RS parity remover 453 outputs the processed data to the derandomizer 454.

The derandomizer 454 performs an inverse process of the randomizer of the transmitting system on the output of the RS decoder/non-systematic RS parity remover 453. Afterwards, the derandomizer 454 inserts a MPEG synchronization byte at the beginning of each packet so as to output the processed data in 188-byte packet units. The output of the derandomizer 454 is outputted to the main MPEG decoder (not shown) and to the main data packet remover 455 at the same time. Meanwhile, the main data packet remover 455 removes a 188-byte unit main data packet from the output of the derandomizer 454 and outputs the processed data to the packet deformatter 456. The packet deformatter 456 removes the 4-byte MPEG header, which was inserted to the enhanced data packet by the packet formatter of the transmitting system, from the enhanced data packet outputted from the main data packet remover 455. Thereafter, the data bytes in which place holders (e.g., place holders for the known data), and not enhanced data, were inserted by the transmitting system are also removed from the enhanced data packet. The processed enhanced data packet is then outputted to the enhanced data processor 457. The enhanced data processor 457 performs an inverse process of the pre-processor 101 of the transmitting system on the output of the packet deformatter 456. Thus, the finally processed enhanced data are outputted.

Figure 5:
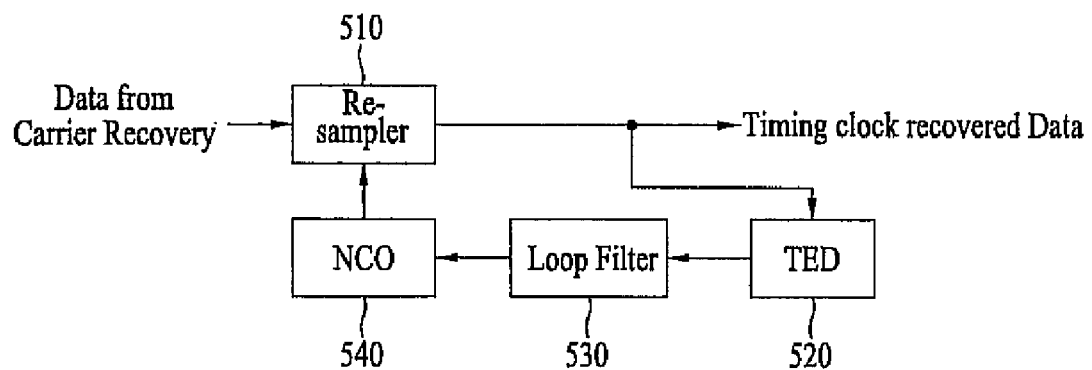
FIG. 5 and FIG. 6 illustrate block diagrams showing exemplary structures of a timing clock recovery unit shown in FIG. 4.
Figure 6:
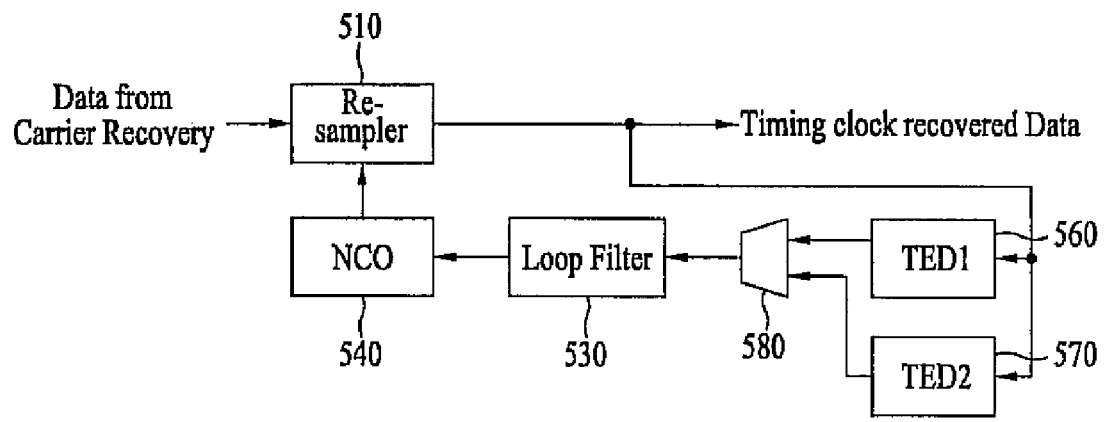

FIG. 5 illustrates a detailed block diagram showing examples of the timing clock recovery within the demodulator 420. More specifically, FIG. 5 illustrates an example of recovering the timing clock by using a single type of timing error detector (TED). FIG. 6 illustrates an example of recovering the timing clock by using two types of timing error detectors (TEDs).

FIG. 5 illustrates a block diagram showing the structure of the timing clock recovery according to an embodiment of the present invention. Referring to FIG. 5, the timing clock recovery includes a resampler 510, a timing error detector 520, a loop filter 530, and a numerically controlled oscillator (NCO) 540. More specifically, the basedband signal being outputted from the carrier recovery 422 is inputted to the resampler 510. The resampler 510 resamples the signal being outputted from the carrier recovery 422 to correspond to the timing clock provided by the NCO 540. Thereafter, the resampled signal is outputted to the known sequence detector 430, the equalizer 440, and the timing error detector 520. In other words, when the A/D converter 410 uses a 25 MHz fixed oscillator, the baseband digital signal having a frequency of 25 MHz, which created by passing through the A/D converter 410, the phase splitter 421, and the carrier recovery 422, is processed with an interpolation process by the resampler 510. Thus, the interpolated signal is recovered to a baseband digital signal having a frequency twice that of the broadcasting symbol clock (i.e., 21.524476 MHz).

The timing error detector 520 detects a timing error from the output signal of the resampler 510. Thereafter, the detected timing error is outputted to the loop filter 530. At this point, the timing error detector 520 is only used as an example in this embodiment of the present invention. Alternatively, a spectral lining method may be used to detect the timing error. The spectral lining method relates to detecting the timing error by using a sideband of a spectrum corresponding to the receiving signal. In another example, if known data sequences having the same data patterns are inserted periodically and transmitted, as shown in FIG. 3, the timing error may be detected by using the corresponding known data. The method of detecting the timing error by using the known data will be described in detail in a later process.

The loop filter 530 filters the timing error information detected by the timing error detector 520, thereby outputting the error of the timing clock to the NCO 540. Generally, the loop filter 530 is configured of a secondary filter so that the phase error and frequency error of the timing clock may be compensated. The NCO 540 accumulates the timing error being outputted from the loop filter 530. Then, the NCO 540 outputs the phase element of the accumulated timing error to the resampler 510 so as to adjust the sampling timing of the resampler 510. More specifically, the NCO 540 is set so that the signal of a correct phase is interpolated and outputted from the resampler 510.

FIG. 6 illustrates a block diagram showing the structure of the timing clock recovery according to another embodiment of the present invention. Referring to FIG. 6, the timing clock recovery includes a resampler 510, a first timing error detector 560, a second timing error detector 570, a multiplexer 580, a loop filter 530, and a numerically controlled oscillator (NCO) 540. Herein, if the data that are being transmitted are divided into a domain having the known data and a domain that does not include the known data, as shown in FIG. 2, the method of detecting the timing error may vary depending upon whether the known data are included or not. Also, it is required to use the timing error detector suitable for each detecting method. Accordingly, the timing clock recovery of FIG. 6 is effective when transmitting data that are divided into a domain having known data of a predetermine length inserted in a pre-decided place and a domain that does not include any known data, as shown in FIG. 2 and FIG. 3.

For example, it is assumed that the first timing error detector 560 detects the timing error by using the sideband of a spectrum corresponding to the received signal, and that the second timing error detector 570 detects the timing error by using the known data. Accordingly, the multiplexer 580 may be designed to select the output of the first timing error detector 560 in the domain that does not include any known data, and to select the output of the second timing error detector 570 in the domain including the known data, thereby outputting the selected outputs to the loop filter 530. Alternatively, the output of the first timing error detector 560 and the output of the second timing error detector 570 may be integrated, in the domain including the known data, and then outputted to the loop filter 530. Thus, by using the known data in the domain including the known data, a highly reliable timing error may be detected, thereby enabling the timing clock to be recovered with more stability.

A plurality of method of detecting timing error using the known data may exist. In the description of the present invention, two different embodiments of such methods will be broadly presented. In an embodiment according to the present inventions the timing error is detected by using the correlation between the known data, which are already known according to an agreement between the transmitting system and the receiving system, and the received data in the time domain. In another embodiment of the present invention, the timing error is detected by using the correlation between two different types of known data received in the frequency domain.

First Embodiment

Figure 7:
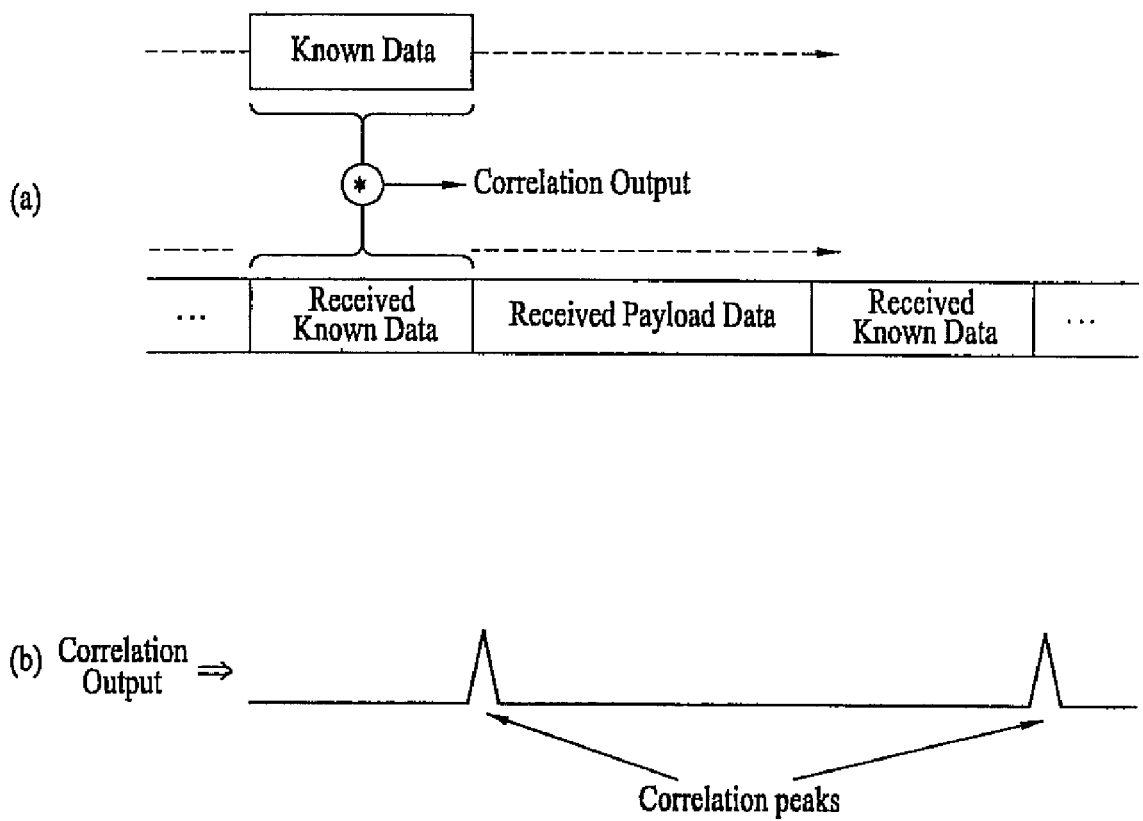
FIG. 7(a) and FIG. 7(b) illustrate examples of detecting timing error in a time domain.
Figure 8:
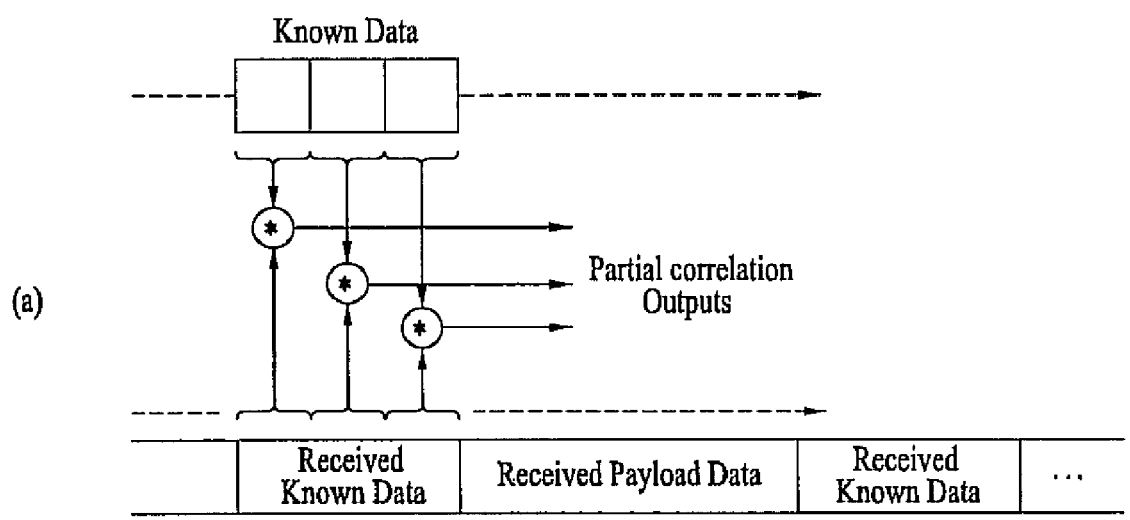
FIG. 8(a) and FIG. 8(b) illustrate other examples of detecting timing error in a time domain.
Figure 8:
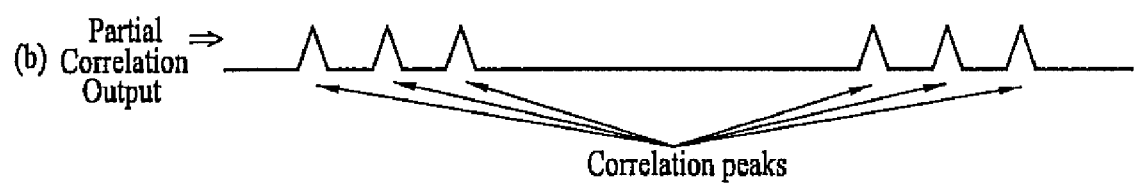

FIG. 7 and FIG. 8 illustrate the method of detecting the timing error by using the correlation between the known data (i.e., the known data generated from the receiving system), which are already known according to an agreement between the transmitting system and the receiving system, and the received data. FIG. 7(*a*) illustrates the process of calculating the correlation value between the known data sequence and the received signal sequence by moving the entire known data sequence, which is being repeated after each data block cycle, in accordance with the received signal sequence. At this point, as shown in FIG. 7(*b*), the correlation value between the known data sequence and the received signal sequence outputs a maximum or peak value (or correlation peak) at the last symbol position of the known data sequence corresponding to the received signal after each data block. FIG. 8(*a*) illustrates a method of calculating the correlation value by dividing the known data sequence to predetermined portions. At this point, the peak correlation value is output as often as the number of divided known data portions. FIG. 8 illustrates an example of calculating the correlation value by dividing the known data sequence into 3 different portions (or sections).

The timing error is calculated at the peak of the correlation value. Thus, calculating only one correlation value by using the entire known data sequence, as shown in FIG. 7, indicates that timing error detection is performed once every data block cycle and then adopted. However, when the known data sequence is divided into a plurality of portions, as shown in FIG. 8, so as to calculate the correlation value with the received signal, the number of correlation peaks corresponding to the number of known data sequence sections may be obtained. Furthermore, the timing error may be detected as often as the number of known data sequence sections. Accordingly, the timing recovery speed may be accelerated. For example, if the known data sequence of the data, that are already known based upon an agreement between the transmitting system and the receiving system, is divided into K number of sections (or portions) so as to be correlated, K number of correlation peaks may be calculated in the known data sequence. Also, K number of timing errors or an adjusted number of timing errors according to combinations may be calculated.

Therefore, when the entire known data sequence is used, dispersion of the timing error detection value is reduced. However, in this case, the application cycle becomes long. On the other hand, when partial known data sequences are used, dispersion of the timing error detection value may be more elevated as compared to when using the entire known data sequence. However, this method is more advantageous in that the application cycle is shortened. When focusing on reducing the influence of the carrier errors, the known data sequence is divided into a plurality of sections. Then, the correlation value corresponding to each divided section (or portion). Thereafter, the obtained correlation values may all be added so as to be used in detecting only one timing error value.

Figure 9:
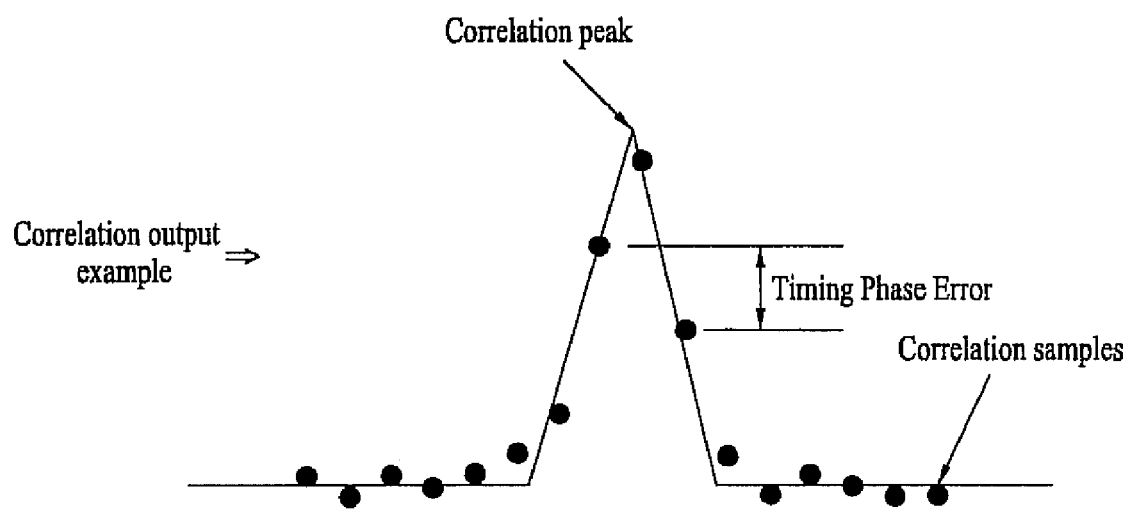
FIG. 9 illustrates an example of detecting timing error using correlation values of FIG. 7 and FIG. 8.

FIG. 9 illustrates in detail the method of detecting timing error by calculating the correlation value between the known data and the received data as described in FIG. 7 and FIG. 8. Referring to FIG. 9, the bold dots indicate the correlation values between the known data and the received data. The solid line indicates the general flow of the bold dots. The bold dots indicate the correlation values calculated with respect to the samples (or signals) sampled at a cycle two times faster than the symbol clock. In FIG. 8, if the influence of random data, noise, and difference in timing clock are excluded, the correlation values between the known data sequence and the received data sequence show a horizontally symmetrical form having the correlation peak as the axis, just as shown through the solid lines. Herein, if a timing phase error exists, the symmetrical form is distorted and does not appear in the samples right before and after the correlation peak. Therefore, the timing error detection using the correlation values may be performed by using the asymmetrical form that is created when a timing clock error has occurred. In other words, a value in proportion to the difference between the value right before the correlation peak and the value right after the correlation peak is used to perform the timing error detection process.

Figure 10:
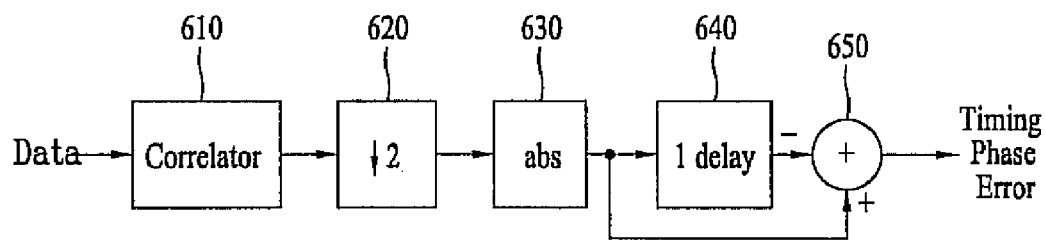
FIG. 10 illustrates a block diagram of a timing error detector for detecting timing error in a time domain according to an embodiment of the present invention.

FIG. 10 illustrates a detailed block diagram of a timing error detector for detecting timing error in a time domain by using the correlation values between the known data and the received data. Herein, the timing error detector includes a correlator 610, a down-sampler 620, an absolute value calculator 630, a delay 640, and a subtracter 650. More specifically, the correlator 610 receives data sampled to a clock more than two times faster than the symbol clock frequency, so as to calculate the correlation value with the known data symbol sequence. Then, the calculated correlation value is outputted to the down-sampler 620. The down-sampler 620 down-samples the correlation value as much as the sampling rate, thereby obtaining a sample of the symbol frequency. For example, if the received data that are being inputted to the correlator 610 correspond to the data sampled to two times of the symbol frequency, the down-sampler 620 ½ down-samples the received data, thereby obtaining a symbol frequency sample.

The correlation value of the down-sampler 620 is inputted to the absolute value calculator 630. Then, the absolute value calculator 630 calculates the absolute value of the down-sampled correlation values or the squared value of the calculated absolute value. Thereafter, the calculated value is converted to an element of a size value that does not include any phase element. The output of the absolute value calculator 630 is provided to the delay 640 and the subtracter 650. The subtracter 650 outputs the difference between the 1-symbol delayed absolute value or the squared value of the delayed absolute value, the value being delayed by the delay 640, and the current absolute value or the squared value of the current absolute value as the timing error value. More specifically, the output of the absolute value calculator 630 is delayed by 1 symbol. And, a difference between the 1-symbol delayed value and the output value of the absolute value calculator 630 is calculated. The calculated difference value corresponds to the value being in proportion to the timing phase error. Herein, the order of each block is not absolute. When calculating the values, the order of each block may also change within a logically valid scope of not changing the result value. For example, the calculations may be performed in the order of the down-sampler, the correlator, and the absolute value calculator. Alternatively, the calculations may also be performed in the order of the correlator, the absolute value calculator, and the down-sampler.

Second Embodiment

The timing error may also be detected by using the frequency characteristics of the known data. More specifically, when a timing frequency error occurs, the phase is either increased or decreased at a constant rate so that the frequency within the bandwidth of the frequency domain signal can be increased. Accordingly, the increasing or decreasing inclination (or gradient) of the phase according to the frequency of a following block may change in proportion to the current block. Therefore, the inclination (or gradient) of the phase change according to the frequency using the frequency characteristic between two known data blocks may be detected, so as to be used as the timing frequency error.

Figure 11:
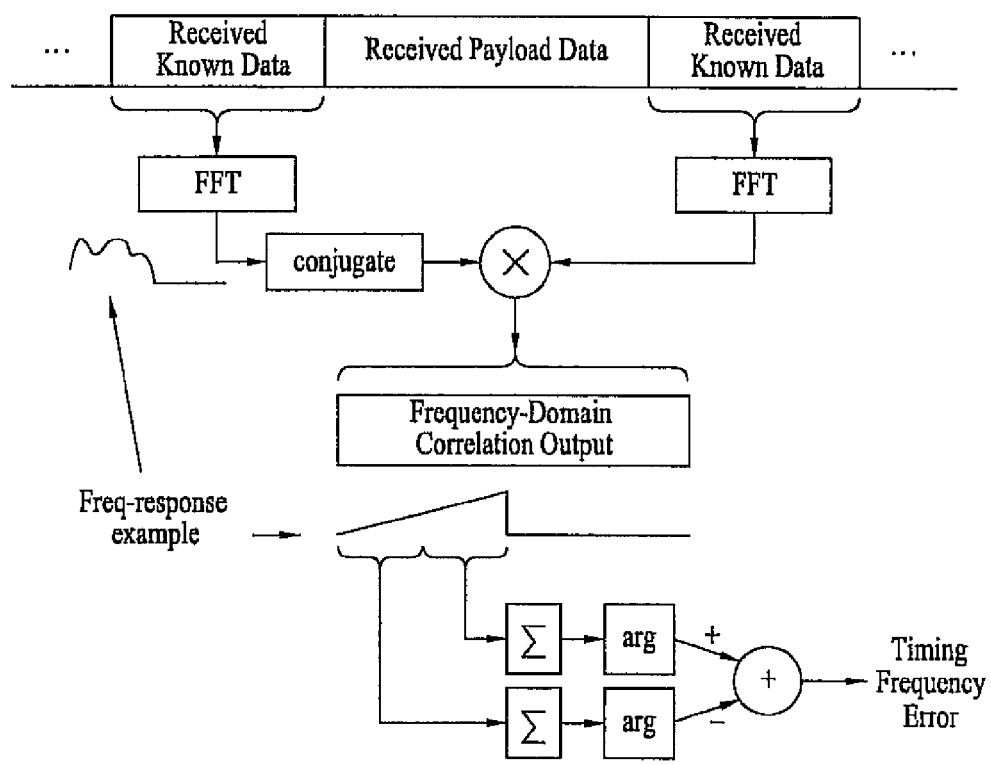
FIG. 11 illustrates an example of detecting timing error in a frequency domain according to an embodiment of the present invention.

FIG. 11 illustrates an example of detecting timing error using the frequency characteristics of the above-described known data. The currently received known data sequence is processed with fast fourier transform (FFT), thereby being converted to frequency domain signals. The previously received known data sequence is also processed with fast fourier transform (FFT), thereby being converted to frequency domain signals also. Subsequently, a conjugate value of a frequency response corresponding to the previous known data sequence is multiplied with each frequency value of a frequency response corresponding to the current known data sequence, thereby obtaining the correlation value within the frequency domain. In the present invention, by obtaining the correlation value between the previous value and the current value, the phase change between known data blocks may be extracted from each frequency. Accordingly, influence of the phase distortion caused by the channel may be additionally eliminated (or removed).

Due to the characteristic of transmission method like a VSB, the frequency response of the complex number signal exists in only half of the domain and not in the entire domain, as shown in the frequency response example of FIG. 11. Accordingly, the correlation value of the frequency domain also exists in only half of the domain. Therefore, in order to obtain the phase gradient of the correlation values within the frequency domain, the significant frequency domain including the correlation values is divided into two separate sub-domains (or sections). The correlation values within each corresponding sub-domain are all added, so as to obtain the phase of the frequency domain. The phase gradient is obtained by calculating the difference between the two phases within the two sub-domains. The calculated phase gradient becomes the timing frequency error. Assuming that the element of each correlation value is divided into a size and a phase, the phase is obtained by adding the correlation value within each frequency so that the size of each correlation value is in proportion to the reliability level, and that the phase of each correlation value, which is in proportion to the sizer influences the final phase.

Figure 12:
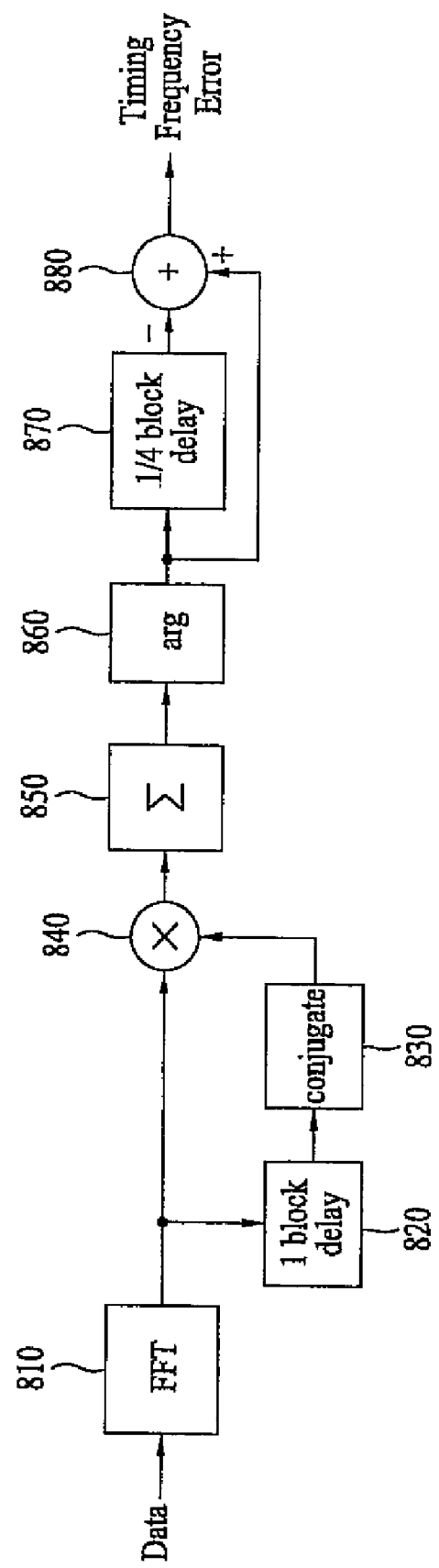
FIG. 12 illustrates a block diagram of a timing error detector for detecting timing error in a frequency domain according to an embodiment of the present invention.

FIG. 12 illustrates a more detailed block diagram of a timing error detector for detecting timing error by using the frequency characteristics of the correlation values between the previous known data sequence and the current known data sequence of FIG. 11. Herein r the timing error detector includes a fast fourier transform (FFT) 810, a first delay 820, a conjugater 830, a multiplier 840, an adder 850, a phase extractor 860, a second delay 870, and a subtracter 880. In the embodiment of the present invention, the first delay 820 corresponds to a 1-data block delay, and the second delay 870 corresponds to a ¼-data block delay. Also, 1 data block indicates a block configured of frequency responses of N number of known data symbol sequences.

More specifically, when the known data domain is known and the received data symbol sequence is inputted, the FFT 810 converts the complex number value of the N number of consecutive known data sequences among the data symbol sequences that are being inputted to the complex number value of the frequency domain. Thereafter, the complex number value converted to the frequency domain value is outputted to the first delay 820 and the multiplier 840. The first delay 820 delays the frequency domain complex number value of the known data by 1 data block. Then, the first delay 820 outputs the 1-data block delayed complex number value to the conjugater 830. The conjugater 830 conjugates the inputted complex number value and outputs the conjugated value to the multiplier 840. The multiplier 840 multiplies in sample units the complex conjugates of the known data corresponding to the current data block being outputted from the FFT 810 and the known data corresponding to the previous data block outputted from the conjugater 830. The multiplied complex conjugates are outputted to the adder 850. In other words, the output of the multiplier 840 corresponds to frequency domain correlation values within one known data block.

The complex number of the data exists only in half of the frequency domain. Therefore, the adder 850 divides the significant data domain within the known data block once again into two significant sub-domains (or sections). Thereafter, the correlation values of the corresponding domain in each significant sub-domain are accumulated and outputted to the phase extractor 860. The phase extractor BD extracts only phase information from the accumulated value of each of the two significant data sub-domains. Subsequently, the phase extractor 860 outputs the extracted phase information to the second delay 870 and the subtracter 880. The phase information delayed by ¼ data block by the second delay 870 is inputted to the subtracter 880. The subtracter 880 calculates the difference between the phase information that is delayed by ¼ data block and the phase information that is outputted from the phase extractor 860. Then, the calculated difference value is outputted as the timing frequency error value.

Figure 13:
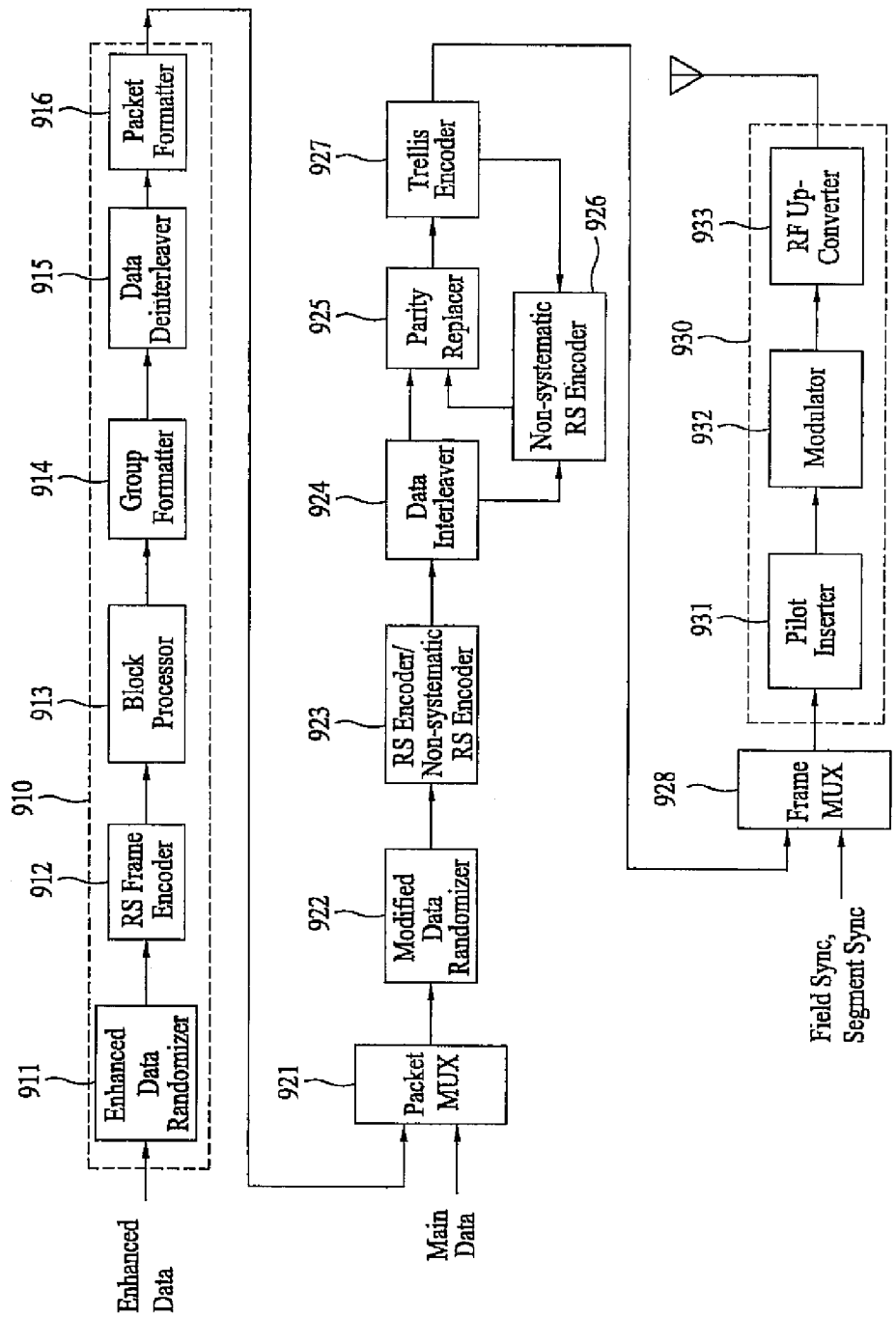
FIG. 13 illustrates a block diagram of a digital broadcast (or television or DTV) transmitting system according to another embodiment of the present invention.

FIG. 13 illustrates a block diagram showing the structure of a digital broadcast transmitting system according to an embodiment of the present invention. The digital broadcast (or DTV) transmitting system includes a pre-processor 910r a packet multiplexer 921, a data randomizer 922, a Reed-Solomon (RS) encoder/non-systematic RS encoder 923, a data interleaver 924, a parity byte replacer 925, a non-systematic RS encoder 926, a frame multiplexer 928, and a transmitting system 930. The pre-processor 910 includes an enhanced data randomizer 911, a RS frame encoder 912, a block processor 913, a group formatter 914, a data deinterleaver 915, and a packet formatter 916.

In the present invention having the above-described structure, main data are inputted to the packet multiplexer 921. Enhanced data are inputted to the enhanced data randomizer 911 of the pre-processor 910, wherein an additional coding process is performed so that the present invention can respond swiftly and appropriately against noise and change in channel. The enhanced data randomizer 911 randomizes the received enhanced data and outputs the randomized enhanced data to the RS frame encoder 912. At this point, by having the enhanced data randomizer 911 perform the randomizing process on the enhanced data, the randomizing process on the enhanced data by the data randomizer 922 in a later process may be omitted. Either the randomizer of the conventional broadcast system may be used as the randomizer for randomizing the enhanced data, or any other type of randomizer may be used herein.

The RS frame encoder 912 receives the randomized enhanced data and performs at least one of an error correction coding process and an error detection coding process on the received data. Accordingly, by providing robustness to the enhanced data, the data can scatter group error that may occur due to a change in the frequency environment. Thus, the data can respond appropriately to the frequency environment which is very poor and liable to change. The RS frame multiplexer 912 also includes a process of mixing in row units many sets of enhanced data each having a pre-determined size. By performing an error correction coding process on the inputted enhanced data, the RS frame encoder 912 adds data required for the error correction and, then, performs an error detection coding process, thereby adding data required for the error detection process. The error correction coding uses the RS coding method, and the error detection coding uses the cyclic redundancy check (CRC) coding method. When performing the RS coding process, parity data required for the error correction are generated. And, when performing the CRC coding process, CRC data required for the error detection are generated.

The RS frame encoder 912 performs CRC coding on the RS coded enhanced data in order to create the CRC code. The CRC code that is generated by the CRC coding process may be used to indicate whether the enhanced data have been damaged by an error while being transmitted through the channel. The present invention may adopt other types of error detection coding methods, apart from the CRC coding method, and may also use the error correction coding method so as to enhance the overall error correction ability of the receiving system. For example, assuming that the size of one RS frame is 187*N bytes, that (235,187)-RS coding process is performed on each column within the RS frame, and that a CRC coding process using a 2-byte (i.e., 16-bit) CRC checksum, then a RS frame having the size of 187*N bytes is expanded to a RS frame of 235*(N+2) bytes. The RS frame expanded by the RS frame encoder 912 is inputted to the block processor 913. The block processor 913 codes the RS-coded and CRC-coded enhanced data at a coding rate of G/H. Then, the block processor 913 outputs the G/H-rate coded enhanced data to the group formatter 914. In order to do so, the block processor 913 identifies the block data bytes being inputted from the RS frame encoder 912 as bits.

The block processor 913 may receive supplemental information data such as signaling information, which include information on the system, and identifies the supplemental information data bytes as data bits. Herein, the supplemental information data, such as the signaling information, may equally pass through the enhanced data randomizer 911 and the RS frame encoder 912 so as to be inputted to the block processor 913. Alternatively, the supplemental information data may be directly inputted to the block processor 913 without passing through the enhanced data randomizer 911 and the RS frame encoder 912. The signaling information corresponds to information required for receiving and processing data included in the data group in the receiving system. Such signaling information includes data group information, multiplexing information, and burst information.

As a G/H-rate encoder, the block processor 913 codes the inputted data at a coding rate of G/H and then outputs the G/H-rate coded data. For example, if 1 bit of the input data is coded to 2 bits and outputted, then G is equal to 1 and H is equal to 2 (i.e., G=1 and H=2). Alternatively, if 1 bit of the input data is coded to 4 bits and outputted, then G is equal to 1 and H is equal to 4 (i.e., G=1 and H=4). As an example of the present invention, it is assumed that the block processor 913 performs a coding process at a coding rate of ½ (also referred to as a ½-rate coding process) or a coding process at a coding rate of ¼ (also referred to as a ¼-rate coding process). More specifically, the block processor 913 codes the received enhanced data and supplemental information data, such as the signaling information, at either a coding rate of ½ or a coding rate of ¼. Thereafter, the supplemental information data, such as the signaling information, are identified and processed as enhanced data.

Since the ¼-rate coding process has a higher coding rate than the ½-rate coding process, greater error correction ability may be provided. Therefore, in a later process, by allocating the ¼-rate coded data in an area with deficient receiving performance within the group formatter 914, and by allocating the ½-rate coded data in an area with excellent receiving performance, the difference in the overall performance may be reduced. More specifically, in case of performing the ½-rate coding process, the block processor 913 receives 1 bit and codes the received 1 bit to 2 bits (i.e., 1 symbol). Then, the block processor 913 outputs the processed 2 bits (or 1 symbol). On the other hand, in case of performing the ¼-rate coding process, the block processor 913 receives 1 bit and codes the received 1 bit to 4 bits (i.e., 2 symbols). Then, the block processor 913 outputs the processed 4 bits (or 2 symbols). Additionally, the block processor 913 performs a block interleaving process in symbol units on the symbol-coded data. Subsequently, the block processor 913 converts to bytes the data symbols that are block-interleaved and have the order rearranged.

The group formatter 914 inserts the enhanced data outputted from the block processor 913 (herein, the enhanced data may include supplemental information data such as signaling information including transmission information) in a corresponding area within the data group, which is configured according to a pre-defined rule. Furthermore, in relation with the data deinterleaving process, various types of places holders or known data are also inserted in corresponding areas within the data group. At this point, the data group may be described by at least one hierarchical area. Herein, the data allocated to the each area may vary depending upon the characteristic of each hierarchical area. Additionally, each group is configured to include a field synchronization signal.

The present invention shows an example of the data group being divided into three hierarchical areas: a head area, a body area, and a tail area. Accordingly, in the data group that is inputted for the data deinterleaving process, data are first inputted to the head area, then inputted to the body area, and inputted finally to the tail area. In the example of the present invention, the head, body, and tail areas are configured so that the body area is not mixed with the main data area within the data group. Furthermore, in the present invention, the head, body, and tail areas may each be divided into lower hierarchical areas. For example, the head area may be divided into 3 lower hierarchical areas: a far head (FH) area, a middle head (MH) area, and a near head (NH) area. The body area may be divided into 4 lower hierarchical areas: a first lower body (B1) area, a second lower body (B2) area, a third lower body (B3) area, and a fourth lower body (B4) area. And, finally, the tail area may be divided into 2 lower hierarchical areas: a far tail (FT) area and a near tail (NT) area.

In the example of the present invention, the group formatter 914 inserts the enhanced data being outputted from the block processor 913 to the middle head (MH) area, the near head (NH) area, the first to fourth lower body (B1 to B4) areas, and the near tail (NT) area. Herein, the type of enhanced data may vary depending upon the characteristic of each area. The data group is divided into a plurality of areas so that each area may be used for different purposes. More specifically, areas having less interference with the main data may show more enhanced receiving performance as compared with area having more interference with the main data. Additionally, when using the system in which the known data are inserted in the data group and then transmitted, and when a long set of consecutive known data is to be periodically (or regularly) inserted in the enhanced data, the body area is capable of regularly receiving such enhanced data having a predetermined length. However, since the enhanced data may be mixed with the main data in the head and tail areas, it is difficult to regularly insert the known data in these areas, and it is also difficult to insert long known data sets that are consecutive in these areas.

Details such as the size of the data group, the number of hierarchical areas within the data group and the size of each hierarchical area, and the number of enhanced data bytes that may be inserted in each hierarchical area may vary depending upon the design of the system designer. Therefore, the above-described embodiment is merely an example that can facilitate the description of the present invention. In the group formatter 914, the data group may be configured to include a position (or place) in which the field synchronization signal is to be inserted. When assuming that the data group is divided into a plurality of hierarchical areas as described above, the block processor 913 may code the data that are to be inserted in each area at different coding rates.

In the present invention, based upon the areas that are each expected to show different performance after the equalization process when using the channel information that may be used for the channel equalization process in the receiving system, a different coding rate may be applied to each of these areas. For example, the block processor 913 codes the enhanced data that are to be inserted in the near head (NH) area and the first to fourth lower body (B1 to B4) areas at a ½-coding rate. Thereafter, the group formatter 914 may insert the ½-rate coded enhanced data in the near head (NH) area and the first to fourth lower body (B1 to B4) areas. On the other hand, the block processor 913 codes the enhanced data that are to be inserted in the middle head (MH) area and the near tail (NT) area at a ¼-coding rate, which has greater error correction ability than the ½-coding rate. Subsequently, the group formatter 914 may insert the ½-rate coded enhanced data in the middle head (MH) area and the near tail (NT) area. Furthermore, the block processor 913 codes the enhanced data that are to be inserted in the far head (FH) area and the far tail (FT) area at a coding rate having even greater error correction ability than the ¼-coding rate. Thereafter, the group formatter 914 may inserts the coded enhanced data either in the far head (FH) and far tail (FT) areas or in a reserved area for future usage.

Apart from the enhanced data, the group formatter 913 may also insert supplemental information data such as signaling information indicating the overall transmission information in the data group. Also, apart from the coded enhanced data outputted from the block processor 913, and in relation with the data deinterleaving process in a later process, the group formatter 914 may also insert a MPEG header place holder, a non-systematic RS parity place holder, and a main data place holder in the data group. Herein, the main data group place holder is inserted because the enhanced data and the main data may be mixed in the head and tail areas depending upon the input of the data deinterleaver. For example, based upon the output of the data after being deinterleaved, the place holder for the MPEG header may be allocated to the front of each data packet. Additionally, the group formatter 914 may either insert known data generated according to a pre-defined rule, or insert a known data place holder for inserting known data in a later process. Furthermore, a place holder for the initialization of the trellis encoder module 927 is inserted in a corresponding area. For example, the initialization data place holder may be inserted at the beginning (or front) of the data place sequence.

The output of the group formatter 914 is inputted to the data deinterleaver 915. And, the data deinterleaver 915 performs an inverse process of the data interleaver deinterleaving the data and place holder within the data group being outputted from the group formatter 914. Thereafter, the data deinterleaver 915 outputs the deinterleaved data to the packet formatter 916. Among the data deinterleaved and inputted, the packet formatter 916 removes the main data place holder and RS parity place holder that were allocated for the deinterleaving process from the inputted deinterleaved data. Thereafter, the remaining portion of the corresponding data is grouped, and 4 bytes of MPEG header are inserted therein. The 4-byte MPEG header is configured of a 1-byte MPEG synchronization byte added to the 3-byte MPEG header place holder.

When the group formatter 914 inserts the known data place holder, the packet formatter 916 may either insert actual known data in the known data place holder or output the known data place holder without any change or modification for a replacement insertion in a later process. Afterwards, the packet formatter 916 divides the data within the above-described packet-formatted data group into 188-byte unit enhanced data packets (i.e., MPEG TS packets), which are then provided to the packet multiplexer 921. The packet multiplexer 921 multiplexes the 188-byte unit enhanced data packet and main data packet outputted from the packet formatter 916 according to a pre-defined multiplexing method. Subsequently, the multiplexed data packets are outputted to the data randomizer 922. The multiplexing method may be modified or altered in accordance with diverse variables of the system design.

As an example of the multiplexing method of the packet multiplexer 921, the enhanced data burst section and the main data section may be identified along a time axis (or a chronological axis) and may be alternately repeated. At this point, the enhanced data burst section may transmit at least one data group, and the main data section may transmit only the main data. The enhanced data burst section may also transmit the main data. If the enhanced data are outputted in a burst structure, as described above, the receiving system receiving only the enhanced data may turn the power on only during the burst section so as to receive the enhanced data, and may turn the power off during the main data section in which main data are transmitted, so as to prevent the main data from being received, thereby reducing the power consumption of the receiving system.

When the data being inputted correspond to the main data packet, the data randomizer 922 performs the same randomizing process of the conventional randomizer. More specifically, the MPEG synchronization byte included in the main data packet is discarded and a pseudo random byte generated from the remaining 187 bytes is used so as to randomize the data. Thereafter, the randomized data are outputted to the RS encoder/non-systematic RS encoder 923. However, when the inputted data correspond to the enhanced data packet, the MPEG synchronization byte of the 4-byte MPEG header included in the enhanced data packet is discarded, and data randomizing is performed only on the remaining 3-byte MPEG header. Randomizing is not performed on the remaining portion of the enhanced data. Instead, the remaining portion of the enhanced data is outputted to the RS encoder/non-systematic RS encoder 923. This is because the randomizing process has already been performed on the enhanced data by the enhanced data randomizer 911 in an earlier process. Herein, a data randomizing process may or may not be performed on the known data (or known data place holder) and the initialization data place holder included in the enhanced data packet.

The RS encoder/non-systematic RS encoder 923 RS-codes the data randomized by the data randomizer 922 or the data bypassing the data randomizer 922. Then, the RS encoder/non-systematic RS encoder 923 adds a 20-byte RS parity to the coded data, thereby outputting the RS-parity-added data to the data interleaver 924. At this point, if the inputted data correspond to the main data packet, the RS encoder/non-systematic RS encoder 923 performs a systematic RS-coding process identical to that of the conventional receiving system on the inputted data, thereby adding the 20-byte RS parity at the end of the 187-byte data. Alternatively, if the inputted data correspond to the enhanced data packet, the 20 bytes of RS parity gained by performing the non-systematic RS-coding are respectively inserted in the decided parity byte places within the enhanced data packet. Herein, the data interleaver 924 corresponds to a byte unit convolutional interleaver. The output of the data interleaver 924 is inputted to the parity byte replacer 925 and the non-systematic RS encoder 926.

Meanwhile, a memory within the trellis encoding module 927, which is positioned after the parity byte replacer 925, should first be initialized in order to allow the output data of the trellis encoding module 927 so as to become the known data defined based upon an agreement between the receiving system and the transmitting system. More specifically, the memory of the trellis encoding module 927 should first be initialized before the known data sequence being inputted is trellis-encoded. At this point, the beginning of the known data sequence that is inputted corresponds to the initialization data place holder inserted by the group formatter 914 and not the actual known data. Therefore, a process of generating initialization data right before the trellis-encoding of the known data sequence being inputted and a process of replacing the initialization data place holder of the corresponding trellis encoding module memory with the newly generated initialization data are required.

A value of the trellis memory initialization data is decided based upon the memory status of the trellis encoding module 927, thereby generating the trellis memory initialization data accordingly. Due to the influence of the replace initialization data, a process of recalculating the RS parity, thereby replacing the RS parity outputted from the trellis encoding module 927 with the newly calculated RS parity is required. Accordingly, the non-systematic RS encoder 926 receives the enhanced data packet including the initialization data place holder that is to be replaced with the initialization data from the data interleaver 924 and also receives the initialization data from the trellis encoding module 927. Thereafter, among the received enhanced data packet, the initialization data place holder is replaced with the initialization data. Subsequently, the RS parity data added to the enhanced data packet are removed. Then, a new non-systematic RS parity is calculated and outputted to the parity byte replacer 925. Accordingly, the parity byte replacer 925 selects the output of the data interleaver 924 as the data within the enhanced data packet, and selects the output of the non-systematic RS encoder 926 as the RS parity. Thereafter, the parity byte replacer 925 outputs the selected data.

Meanwhile, if the main data packet is inputted, or if the enhanced data packet that does not include the initialization data place holder that is to be replaced, the parity byte replacer 925 selects the data and RS parity outputted from the data interleaver 924 and directly outputs the selected data to the trellis encoding module 927 without modification. The trellis encoding module 927 converts the byte-unit data to symbol-unit data and 12-way interleaves and trellis-encodes the converted data, which are then outputted to the frame multiplexer 928. The frame multiplexer 928 inserts field synchronization and segment synchronization signals in the output of the trellis encoding module 927 and then outputs the processed data to the transmitter 930. Herein, the transmitter 930 includes a pilot inserter 931, a modulator 932, and a radio frequency (RF) up-converter 933. The operation of the transmitter 930 is identical to the conventional transmitters. Therefore, a detailed description of the same will be omitted for simplicity.

Figure 14:
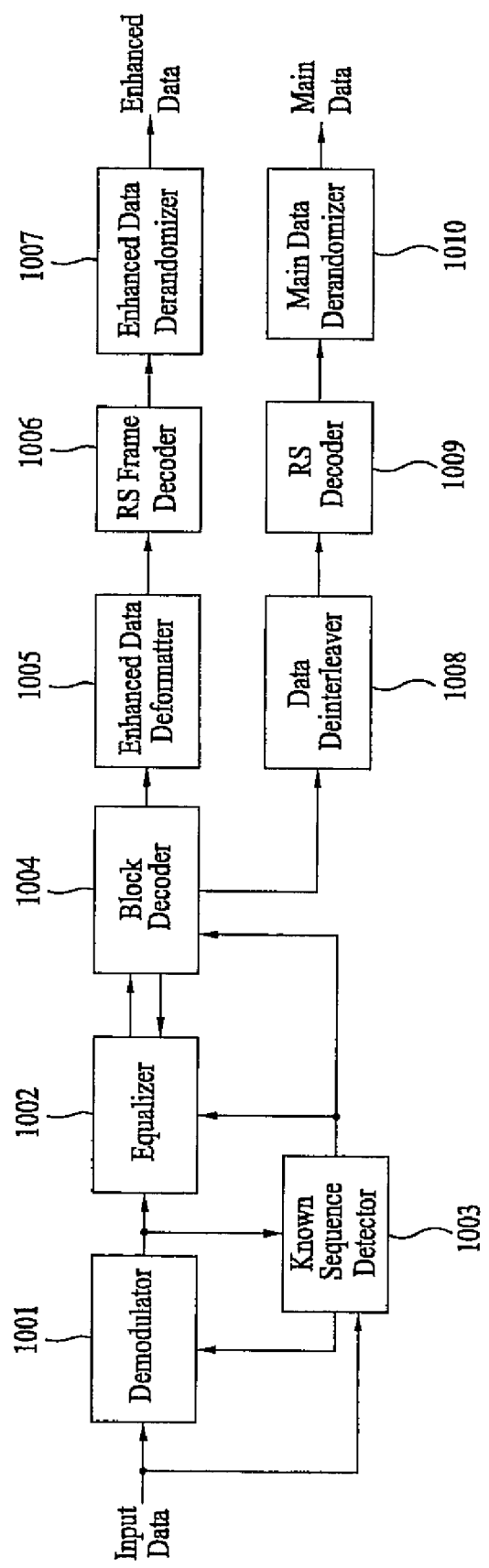
FIG. 14 illustrates a block diagram showing a general structure of a demodulating unit within a digital broadcast (or television or DTV) receiving system according to another embodiment of the present invention.

FIG. 14 illustrates a block diagram of a demodulating unit included in the receiving system according to another embodiment of the present invention. Herein, the demodulating unit may effectively process signals transmitted from the transmitting system shown in FIG. 13. Referring to FIG. 14, the demodulating unit includes a demodulator 1001, a channel equalizer 1002, a known data detector 1003, a block decoder 1004, an enhanced data deformatter 1005, a RS frame decoder 1006, an enhanced data derandomizer 1007, a data deinterleaver 1008, a RS decoder 1009, and a main data derandomizer 1010. For simplicity, the demodulator 1001, the channel equalizer 1002, the known data detector 1003, the block decoder 1004, the enhanced data deformatter 1005, the RS frame decoder 1006, and the enhanced data derandomizer 1007 will be referred to as an enhanced data processor. And, the data deinterleaver 1008, the RS decoder 1009, and the main data derandomizer 1010 will be referred to as a main data processor.

More specifically, the enhanced data including known data and the main data are received through the tuner and inputted to the demodulator 1001 and the known data detector 1003. The demodulator 1001 performs automatic gain control, carrier wave recovery, and timing recovery on the data that are being inputted, thereby creating baseband data, which are then outputted to the equalizer 1002 and the known data detector 1003. The equalizer 1002 compensates the distortion within the channel included in the demodulated data. Then, the equalizer 1002 outputs the compensated data to the block decoder 1004.

At this point, the known data detector 1003 detects the known data place inserted by the transmitting system to the input/output data of the demodulator 1001 (i.e., data prior to demodulation or data after demodulation). Then, along with the position information, the known data detector 1003 outputs the symbol sequence of the known data generated from the corresponding position to the demodulator 1001 and the equalizer 1002. Additionally, the known data detector 1003 outputs information enabling the block decoder 1004 to identify the enhanced data being additionally encoded by the transmitting system and the main data that are not additionally encoded to the block decoder 1004. Furthermore, although the connection is not shown in FIG. 14, the information detected by the known data detector 1003 may be used in the overall receiving system and may also be used in the enhanced data formatter 1005 and the RS frame decoder 1006.

By using the known data symbol sequence when performing the timing recovery or carrier wave recovery, the demodulating performance of the demodulator 1001 may be enhanced. Similarly, by using the known data, the channel equalizing performance of the channel equalizer 1002 may be enhanced. Furthermore, by feeding-back the demodulation result of the block demodulator 1004, the channel equalizing performance may also be enhanced. Herein, the channel equalizer 1002 may perform channel equalization through various methods. In the present invention, a method of estimating a channel impulse response (CIR) for performing the channel equalization process will be given as an example of the present invention. More specifically, in the present invention, the channel impulse response (CIR) is differently estimated and applied in accordance with each hierarchical area within the data group that are transmitted from the transmitting system. Furthermore, by using the known data having the position (or place) and contents pre-known according to an agreement between the transmitting system and the receiving system, so as to estimate the CIR, the channel equalization process may be processed with more stability.

In the present invention, one data group that is inputted for channel equalization is divided into three hierarchical areas: a head area, a body area, and a tail area. Then, each of the areas is divided into lower hierarchical areas. More specifically, the head area may be divided into a far head (FH) area, a middle head (MH) area, and a near head (NH) area. And, the tail area may be divided into a far tail (FT) area and a near tail (NT) area. Furthermore, based upon a long known data sequence, the body area may be divided into 4 lower hierarchical areas: a first lower body (B1) area, a second lower body (B2) area, a third lower body (B3) area, and a fourth lower body (B4) area. In performing channel equalization on the data within the data group by using the CIR estimated from the field synchronization signal and the known data sequence, and in accordance with the characteristic of each area, either one of the estimated CIRs may be directly used without modification, or a CIR created by interpolating or extrapolating a plurality of CIRs may be used.

Meanwhile, if the data being channel equalized and then inputted to the block decoder 1004 correspond to the enhanced data on which additional encoding and trellis encoding are both performed by the transmitting system, trellis-decoding and additional decoding processes are performed as inverse processes of the transmitting system. Alternatively, if the data being channel equalized and then inputted to the block decoder 1004 correspond to the main data on which additional encoding is not performed and only trellis-encoding is performed by the transmitting system, only the trellis-decoding process is performed. The data group decoded by the block decoder 1004 is inputted to the enhanced data deformatter 1005, and the main data packet is inputted to the data deinterleaver 1008.

More specifically, if the inputted data correspond to the main data, the block decoder 1004 performs Viterbi decoding on the inputted data, so as to either output a hard decision value or hard-decide a soft decision value and output the hard-decided result. On the other hand, if the inputted correspond to the enhanced data, the block decoder 1004 outputs either a hard decision value or a soft decision value on the inputted enhanced data. In other words, if the data inputted to the block decoder 1004 correspond to the enhanced data, the block decoder 1004 performs a decoding process on the data encoded by the block processor and the trellis encoder of the transmitting system. At this point, the output of the RS frame encoder included in the pre-processor of the transmitting system becomes an external code, and the output of the block processor and the trellis encoder becomes an internal code. In order to show maximum performance of the external code when decoding such connection codes, the decoder of the internal code should output a soft decision value. Therefore, the block decoder 1004 may output a hard decision value on the enhanced data. However, when required, it is more preferable that the block decoder 1004 outputs a soft decision value.

The present invention may also be used for configuring a reliability map using the soft decision value. The reliability map determines and indicates whether a byte corresponding to a group of 8 bits decided by the code of the soft decision value is reliable. For example, when an absolute value of the soft decision value exceeds a pre-determined threshold value, the value of the bit corresponding to the soft decision value code is determined to be reliable. However, if the absolute value does not exceed the pre-determined threshold value, then the value of the corresponding bit is determined to be not reliable. Further, if at least one bit among the group of 8 bits, which are determined based upon the soft decision value, is determined to be not reliable, then the reliability map indicates that the entire byte is not reliable. Herein, the process of determining the reliability by 1-bit units is merely exemplary. The corresponding byte may also be indicated to be not reliable if a plurality of bits (e.g., 4 bits) is determined to be not reliable.

Conversely, when all of the bits are determined to be reliable within one byte (i.e., when the absolute value of the soft value of all bits exceeds the pre-determined threshold value), then the reliability map determines and indicates that the corresponding data byte is reliable. Similarly, when more than 4 bits are determined to be reliable within one data byte, then the reliability map determines and indicates that the corresponding data byte is reliable. The estimated numbers are merely exemplary and do not limit the scope and spirit of the present invention. Herein, the reliability map may be used when performing error correction decoding processes.

Meanwhile, the data deinterleaver 1008, the RS decoder 1009, and the main data derandomizer 1010 are blocks required for receiving the main data. These blocks may not be required in a receiving system structure that receives only the enhanced data. The data deinterleaver 1008 performs an inverse process of the data interleaver of the transmitting system. More specifically, the data deinterleaver 100B deinterleaves the main data being outputted from the block decode 1004 and outputs the deinterleaved data to the RS decoder 1009. The RS decoder 1009 performs systematic RS decoding on the deinterleaved data and outputs the systematically decoded data to the main data derandomizer 1010. The main data derandomizer 1010 receives the data outputted from the RS decoder 1009 so as to generate the same pseudo random byte as that of the randomizer in the transmitting system. The main data derandomizer 1010 then performs a bitwise exclusive OR (XOR) operation on the generated pseudo random data byte, thereby inserting the MPEG synchronization bytes to the beginning of each packet so as to output the data in 188-byte main data packet units.

Herein, the format of the data being outputted to the enhanced data deformatter 1005 from the block decoder 1004 is a data group format. At this point, the enhanced data deformatter 1005 already knows the structure of the input data. Therefore, the enhanced data deformatter 1005 identifies the system information including signaling information and the enhanced data from the data group. Thereafter, the identified signaling information is transmitted to where the system information is required, and the enhanced data are outputted to the RS frame decoder 1006. The enhanced data deformatter 1005 removes the known data, trellis initialization data, and MPEG header that were included in the main data and the data group and also removes the RS parity that was added by the RS encoder/non-systematic RS encoder of the transmitting system. Thereafter, the processed data are outputted to the RS frame decoder 1006.

More specifically, the RS frame decoder 1006 receives the RS-coded and CRC-coded enhanced data from the enhanced data deformatter 1005 so as to configure the RS frame. The RS frame decoder 1006 performs an inverse process of the RS frame encoder included in the transmitting system, thereby correcting the errors within the RS frame. Then, the 1-byte MPEG synchronization byte, which was removed during the RS frame coding process, is added to the error corrected enhanced data packet. Subsequently, the processed data are outputted to the enhanced data derandomizer 1007. Herein, the enhanced data derandomizer 1007 performs a derandomizing process, which corresponds to an inverse process of the enhanced data randomizer included in the transmitting system, on the received enhanced data. Then, by outputting the processed data, the enhanced data transmitted from the transmitting system can be obtained.

According to an embodiment of the present invention, the RS frame decoder 1006 may also be configured as follows. The RS frame decoder 1006 may perform a CRC syndrome check on the RS frame, thereby verifying whether or not an error has occurred in each row. Subsequently, the CRC checksum is removed and the presence of an error is indicated on a CRC error flag corresponding to each row. Then, a RS decoding process is performed on the RS frame having the CRC checksum removed in a column direction. At this point, depending upon the number of CRC error flags, a RS erasure decoding process may be performed. More specifically, by checking the CRC error flags corresponding to each row within the RS frame, the number of CRC error flags may be determined whether it is greater or smaller than the maximum number of errors, when RS decoding the number of rows with errors (or erroneous rows) in the column direction. Herein, the maximum number of errors corresponds to the number of parity bytes inserted during the RS decoding process. As an example of the present invention, it is assumed that 48 parity bytes are added to each column.

If the number of rows with CRC errors is equal to or smaller than the maximum number of errors (e.g., 48), which may be corrected by the RS erasure decoding process, the RS erasure decoding process is performed on the RS frame in the column direction. Thereafter, the 48 bytes of parity data that were added at the end of each column are removed. However, if the number of rows with CRC errors is greater than the maximum number of errors (e.g., 48), which may be corrected by the RS erasure decoding process, the RS erasure decoding process cannot be performed. In this case, the error may be corrected by performing a general RS decoding process.

As another embodiment of the present invention, the error correction ability may be enhanced by using the reliability map created when configuring the RS frame from the soft decision value. More specifically, the RS frame decoder 1006 compares the absolute value of the soft decision value obtained from the block decoder 1004 to the pre-determined threshold value so as to determine the reliability of the bit values that are decided by the code of the corresponding soft decision value. Then, 8 bits are grouped to configure a byte. Then, the reliability information of the corresponding byte is indicated on the reliability map. Therefore, even if a specific row is determined to have CRC errors as a result of the CRC syndrome checking process of the corresponding row, it is not assumed that all of the data bytes included in the corresponding row have error. Instead, only the data bytes that are determined to be not reliable, after referring to the reliability information on the reliability map, are set to have errors. In other words, regardless of the presence of CRC errors in the corresponding row, only the data bytes that are determined to be not reliable (or unreliable) by the reliability map are set as erasure points.

Thereafter, if the number of erasure points for each column is equal to or smaller than the maximum number of errors (e.g., 48), the RS erasure decoding process is performed on the corresponding the column. Conversely, if the number of erasure points is greater than the maximum number of errors (e.g., 48), which may be corrected by the RS erasure decoding process, a general decoding process is performed on the corresponding column. In other words, if the number of rows having CRC errors is greater than the maximum number of errors (e.g., 48), which may be corrected by the RS erasure decoding process, either a RS erasure decoding process or a general RS decoding process is performed on a particular column in accordance with the number of erasure point within the corresponding column, wherein the number is decided based upon the reliability information on the reliability map. When the above-described process is performed, the error correction decoding process is performed in the direction of all of the columns included in the RS frame. Thereafter, the 48 bytes of parity data added to the end of each column are removed.

Figure 15:
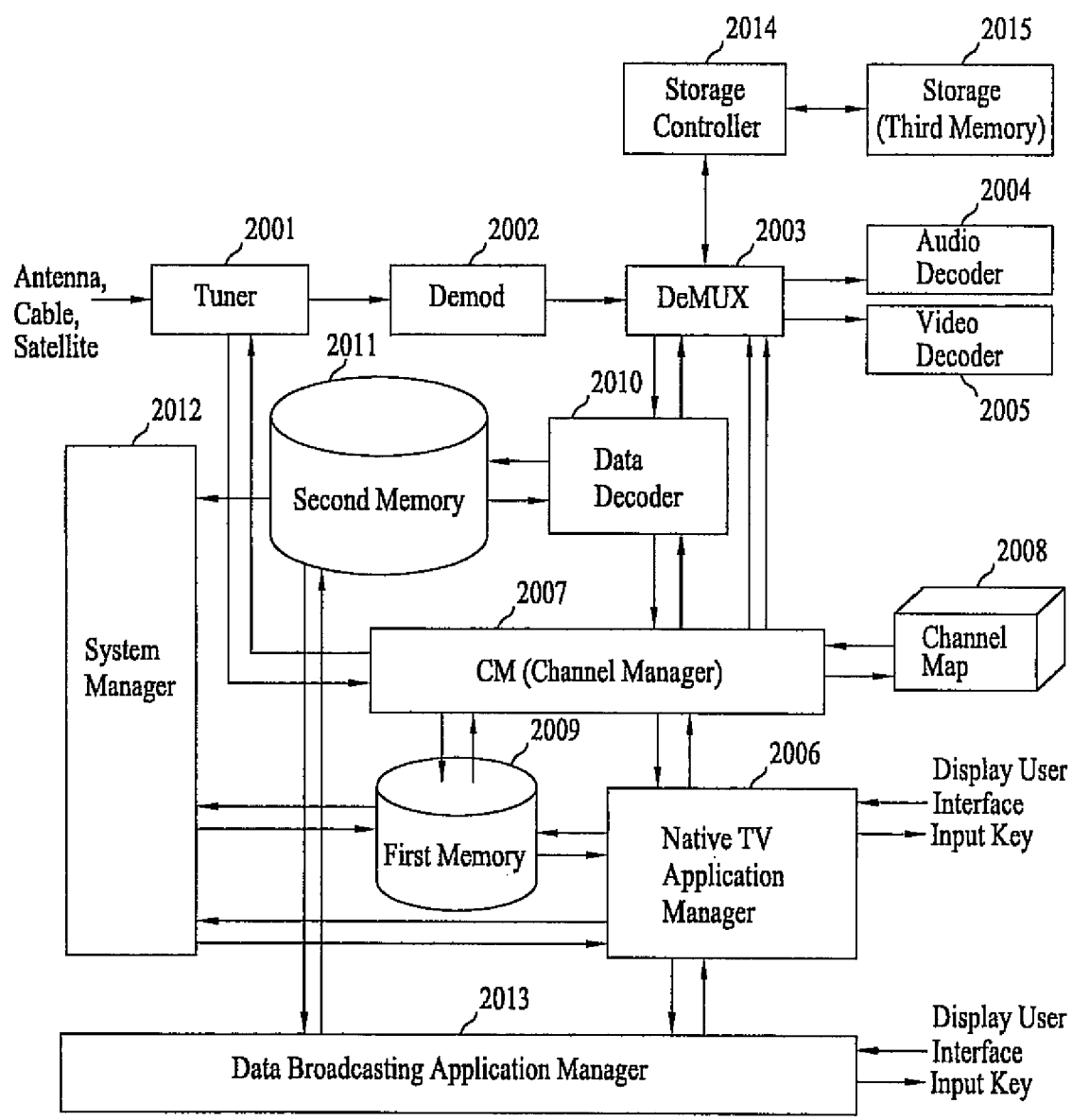
FIG. 15 illustrates a block diagram showing the structure of a digital broadcast (or television or DTV) receiving system according to an embodiment of the present invention.

FIG. 15 illustrates a block diagram showing the structure of a digital broadcast receiving system according to an embodiment of the present invention. Referring to FIG. 15, the digital broadcast receiving system includes a tuner 2001, a demodulating unit 2002, a demultiplexer 2003, an audio decoder 2004, a video decoder 2005, a native TV application manager 2006, a channel manager 2007, a channel map 2008, a first memory 2009, a data decoder 201D, a second memory 2011, a system manager 2012, a data broadcasting application manager 2013, a storage controller 2014, and a third memory 2015. Herein, the third memory 2015 is a mass storage device, such as a hard disk drive (HDD) or a memory chip. The tuner 2001 tunes a frequency of a specific channel through any one of an antenna, cable, and satellite. Then, the tuner 2001 down-converts the tuned frequency to an intermediate frequency (IF), which is then outputted to the demodulating unit 2002. At this point, the tuner 2001 is controlled by the channel manager 2007. Additionally, the result and strength of the broadcast signal of the tuned channel are also reported to the channel manager 2007. The data that are being received by the frequency of the tuned specific channel include main data, enhanced data, and table data for decoding the main data and enhanced data.

In the embodiment of the present invention, examples of the enhanced data may include data provided for data service, such as Java application data, HTML application data, XML data, and so on. The data provided for such data services may correspond either to a Java class file for the Java application, or to a directory file designating positions (or locations) of such files. Furthermore, such data may also correspond to an audio file and/or a video file used in each application. The data services may include weather forecast services, traffic information services, stock information services, services providing information quiz programs providing audience participation services, real time poll, user interactive education programs, gaming services, services providing information on soap opera (or TV series) synopsis, characters, original sound track, filing sites, services providing information on past sports matches, profiles and accomplishments of sports players, product information and product ordering services, services providing information on broadcast programs by media type, airing time, subject, and so on. The types of data services described above are only exemplary and are not limited only to the examples given herein. Furthermore, depending upon the embodiment of the present invention, the enhanced data may correspond to meta data. For example, the meta data use the XML application so as to be transmitted through a DSM-CC protocol.

The demodulating unit 2002 performs demodulation and channel equalization on the signal being outputted from the tuner 2001, thereby identifying the main data and the enhanced data. Thereafter, the identified main data and enhanced data are outputted in TS packet units. Examples of the demodulating unit 2002 is shown in FIG. 4 and FIG. 14. The demodulating unit shown in FIG. 4 and FIG. 14 is merely exemplary and the scope of the present invention is not limited to the examples set forth herein. In the embodiment given as an example of the present invention, only the enhanced data packet outputted from the demodulating unit 2002 is inputted to the demultiplexer 2003. In this case, the main data packet is inputted to another demultiplexer (not shown) that processes main data packets. Herein, the storage controller 2014 is also connected to the other demultiplexer in order to store the main data after processing the main data packets. The demultiplexer of the present invention may also be designed to process both enhanced data packets and main data packets in a single demultiplexer.

The storage controller 2014 is interfaced with the demultiplexer so as to control instant recording, reserved (or pre-programmed) recording, time shift, and so on of the enhanced data and/or main data. For example, when one of instant recording, reserved (or pre-programmed) recording, and time shift is set and programmed in the receiving system (or receiver) shown in FIG. 15, the corresponding enhanced data and/or main data that are inputted to the demultiplexer are stored in the third memory 2015 in accordance with the control of the storage controller 2014. The third memory 2015 may be described as a temporary storage area and/or a permanent storage area. Herein, the temporary storage area is used for the time shifting function, and the permanent storage area is used for a permanent storage of data according to the user's choice (or decision).

When the data stored in the third memory 2015 need to be reproduced (or played), the storage controller 2014 reads the corresponding data stored in the third memory 2015 and outputs the read data to the corresponding demultiplexer (e.g., the enhanced data are outputted to the demultiplexer 2003 shown in FIG. 15). At this point, according to the embodiment of the present invention, since the storage capacity of the third memory 2015 is limited, the compression encoded enhanced data and/or main data that are being inputted are directly stored in the third memory 2015 without any modification for the efficiency of the storage capacity. In this case, depending upon the reproduction (or reading) command, the data read from the third memory 2015 pass trough the demultiplexer so as to be inputted to the corresponding decoder, thereby being restored to the initial state.

The storage controller 2014 may control the reproduction (or play), fast-forward, rewind, slow motion, instant replay functions of the data that are already stored in the third memory 2015 or presently being buffered. Herein, the instant replay function corresponds to repeatedly viewing scenes that the viewer (or user) wishes to view once again. The instant replay function may be performed on stored data and also on data that are currently being received in real time by associating the instant replay function with the time shift function. If the data being inputted correspond to the analog format, for example, if the transmission mode is NTSC, PAL, and so on, the storage controller 2014 compression encodes the inputted data and stored the compression-encoded data to the third memory 2015. In order to do so, the storage controller 2014 may include an encoder, wherein the encoder may be embodied as one of software, middleware, and hardware. Herein, an MPEG encoder may be used as the encoder according to an embodiment of the present invention. The encoder may also be provided outside of the storage controller 2014.

Meanwhile, in order to prevent illegal duplication (or copies) of the input data being stored in the third memory 2015, the storage controller 2014 scrambles the input data and stores the scrambled data in the third memory 2015. Accordingly, the storage controller 2014 may include a scramble algorithm for scrambling the data stored in the third memory 2015 and a descramble algorithm for descrambling the data read from the third memory 2015. Herein, the definition of scramble includes encryption, and the definition of descramble includes decryption. The scramble method may include using an arbitrary key (e.g., control word) to modify a desired set of data, and also a method of mixing signals.

Meanwhile, the demultiplexer 2003 receives the real-time data outputted from the demodulating unit 2002 or the data read from the third memory 2015 and demultiplexes the received data. In the example given in the present invention, the demultiplexer 2003 performs demultiplexing on the enhanced data packet. Therefore, in the present invention, the receiving and processing of the enhanced data will be described in detail. It should also be noted that a detailed description of the processing of the main data will be omitted for simplicity starting from the description of the demultiplexer 2003 and the subsequent elements.

The demultiplexer 2003 demultiplexes enhanced data and program specific information/program and system information protocol (PSI/PSIP) tables from the enhanced data packet inputted in accordance with the control of the data decoder 2010. Thereafter, the demultiplexed enhanced data and PSI/PSIP tables are outputted to the data decoder 2010 in a section format. In order to extract the enhanced data from the channel through which enhanced data are transmitted and to decode the extracted enhanced data, system information is required. Such system information may also be referred to as service information. The system information may include channel information, event information, etc. In the embodiment of the present invention, the PSI/PSIP tables are applied as the system information. However, the present invention is not limited to the example set forth herein. More specifically, regardless of the name, any protocol transmitting system information in a table format may be applied in the present invention.

The PSI table is an MPEG-2 system standard defined for identifying the channels and the programs. The PSIP table is an advanced television systems committee (ATSC) standard that can identify the channels and the programs. The PSI table may include a program association table (PAT), a conditional access table (CAT), a program map table (PMT), and a network information table (NIT). Herein, the PAT corresponds to special information that is transmitted by a data packet having a PID of '0'. The PAT transmits PID information of the PMT and PID information of the NIT corresponding to each program. The CAT transmits information on a paid broadcast system used by the transmitting system. The PMT transmits PID information of a transport stream (TS) packet, in which program identification numbers and individual bit sequences of video and audio data configuring the corresponding program are transmitted, and the PID information, in which PCR is transmitted. The NIT transmits information of the actual transmission network.

The PSIP table may include a virtual channel table (VCT), a system time table (STT), a rating region table (RRT), an extended text table (ETT), a direct channel change table (DCCT), an event information table (EIT), and a master guide table (MGT). The VCT transmits information on virtual channels, such as channel information for selecting channels and information such as packet identification (PID) numbers for receiving the audio and/or video data. More specifically, when the VCT is parsed, the PID of the audio/video data of the broadcast program may be known. Herein, the corresponding audio/video data are transmitted within the channel along with the channel name and the channel number. The STT transmits information on the current data and timing information. The RRT transmits information on region and consultation organs for program ratings. The ETT transmits additional description of a specific channel and broadcast program. The EIT transmits information on virtual channel events (e.g., program title, program start time, etc.). The DCCT/DCCSCT transmits information associated with automatic (or direct) channel change. And, the MGT transmits the versions and PID information of the above-mentioned tables included in the PSIP.

Each of the above-described tables included in the PSI/PSIP is configured of a basic unit referred to as a "section", and a combination of one or more sections forms a table. For example, the VCT may be divided into 256 sections. Herein, one section may include a plurality of virtual channel information. However, a single set of virtual channel information is not divided into two or more sections. At this point, the receiving system may parse and decode the data for the data service that are transmitting by using only the tables included in the PSI, or only the tables included in the PISP, or a combination of tables included in both the PSI and the PSIP. In order to parse and decode the data for the data service, at least one of the PAT and PMT included in the PSI, and the VCT included in the PSIP is required. For example, the PAT may include the system information for transmitting the data corresponding to the data service, and the PID of the PMT corresponding to the data service data (or program number). The PMT may include the PID of the TS packet used for transmitting the data service data. The VCT may include information on the virtual channel for transmitting the data service data, and the PID of the TS packet for transmitting the data service data.

Meanwhile, depending upon the embodiment of the present invention, a DVB-SI may be applied instead of the PSIP. The DVB-SI may include a network information table (NIT), a service description table (SDT), an event information table (EIT), and a time and data table (TDT). The DVB-SI may be used in combination with the above-described PSI. Herein, the NIT divides the services corresponding to particular network providers by specific groups. The NIT includes all tuning information that are used during the IRD set-up. The NIT may be used for informing or notifying any change in the tuning information. The SDT includes the service name and different parameters associated with each service corresponding to a particular MPEG multiplex. The EIT is used for transmitting information associated with all events occurring in the MPEG multiplex. The EIT includes information on the current transmission and also includes information selectively containing different transmission streams that may be received by the IRD. And, the TDT is used for updating the clock included in the IRD.

Furthermore, three selective SI tables (i.e., a bouquet associate table (BAT), a running status table (RST), and a stuffing table (ST)) may also be included. More specifically, the bouquet associate table (BAT) provides a service grouping method enabling the IRD to provide services to the viewers. Each specific service may belong to at least one 'bouquet' unit. A running status table (RST) section is used for promptly and instantly updating at least one event execution status. The execution status section is transmitted only once at the changing point of the event status. Other SI tables are generally transmitted several times. The stuffing table (ST) may be used for replacing or discarding a subsidiary table or the entire SI tables.

In the present invention, the enhanced data included in the payload within the TS packet consist of a digital storage media-command and control (DSM-CC) section format. However, the TS packet including the data service data may correspond either to a packetized elementary stream (PES) type or to a section type. More specifically, either the PES type data service data configure the TS packet, or the section type data service data configure the TS packet. The TS packet configured of the section type data will be given as the example of the present invention. At this point, the data service data are includes in the digital storage media-command and control (DSM-CC) section. Herein, the DSM-CC section is then configured of a 188-byte unit TS packet.

Furthermore, the packet identification of the TS packet configuring the DSM-CC section is included in a data service table (DST). When transmitting the DST, '0×95' is assigned as the value of a stream_type field included in the service location descriptor of the PMT or the VCT. More specifically, when the PMT or VCT stream_type field value is '0×95', the receiving system may acknowledge that data broadcasting including enhanced data (i.e., the enhanced data) is being received. At this point, the enhanced data may be transmitted by a data carousel method. The data carousel method corresponds to repeatedly transmitting identical data on a regular basis.

At this point, according to the control of the data decoder 2010, the demultiplexer 2003 performs section filtering, thereby discarding repetitive sections and outputting only the non-repetitive sections to the data decoder 2010. The demultiplexer 2003 may also output only the sections configuring desired tables (e.g., VCT) to the data decoder 2010 by section filtering. Herein, the VCT may include a specific descriptor for the enhanced data. However, the present invention does not exclude the possibilities of the enhanced data being included in other tables, such as the PMT. The section filtering method may include a method of verifying the PID of a table defined by the MGT, such as the VCT, prior to performing the section filtering process. Alternatively, the section filtering method may also include a method of directly performing the section filtering process without verifying the MGT, when the VCT includes a fixed PID (i.e., a base PID). At this point, the demultiplexer 2003 performs the section filtering process by referring to a table_id field, a version-_number field, a section_number field, etc.

As described above, the method of defining the PID of the VCT broadly includes two different methods. Herein, the PID of the VCT is a packet identifier required for identifying the VCT from other tables. The first method consists of setting the PID of the VCT so that it is dependent to the MGT. In this case, the receiving system cannot directly verify the VCT among the many PSI and/or PSIP tables. Instead, the receiving system must check the PID defined in the MGT in order to read the VCT. Herein, the MGT defines the PID, size, version number, and so on, of diverse tables. The second method consists of setting the PID of the VCT so that the PID is given a base PID value (or a fixed PID value), thereby being independent from the MGT. In this case, unlike in the first method, the VCT according to the present invention may be identified without having to verify every single PID included in the MGT. Evidently, an agreement on the base PID must be previously made between the transmitting system and the receiving system.

Meanwhile, in the embodiment of the present invention, the demultiplexer 2003 may output only an application information table (AIT) to the data decoder 2010 by section filtering. The AIT includes information on an application being operated in the receiving system for the data service. The AIT may also be referred to as an XAIT, and an AMT. Therefore, any table including application information may correspond to the following description. When the AIT is transmitted, a value of '0x05' may be assigned to a stream_type field of the PMT. The AIT may include application information, such as application name, application version, application priority, application ID, application status (i.e., auto-start, user-specific settings, kill, etc.), application type (i.e., Java or HTML), position (or location) of stream including application class and data files, application platform directory, and location of application icon.

In the method for detecting application information for the data service by using the AIT, component_tag, original_network_id, transport_stream_id, and service_id fields may be used for detecting the application information. The component_tag field designates an elementary stream carrying a DSI of a corresponding object carousel. The original_network_id field indicates a DVB-SI original_network_id of the TS providing transport connection. The transport_stream_id field indicates the MPEG TS of the TS providing transport connection, and the service_id field indicates the DVB-SI of the service providing transport connection. Information on a specific channel may be obtained by using the original_network_id field, the transport_stream_id field, and the service_id field. The data service data, such as the application data, detected by using the above-described method may be stored in the second memory 2011 by the data decoder 2010.

The data decoder 2010 parses the DSM-CC section configuring the demultiplexed enhanced data. Then, the enhanced data corresponding to the parsed result are stored as a database in the second memory 2011. The data decoder 2010 groups a plurality of sections having the same table identification (table_id) so as to configure a table, which is then parsed. Thereafter, the parsed result is stored as a database in the second memory 2011. At this point, by parsing data and/or sections, the data decoder 2010 reads all of the remaining actual section data that are not section-filtered by the demultiplexer 2003. Then, the data decoder 2010 stores the read data to the second memory 2011. The second memory 2011 corresponds to a table and data carousel database storing system information parsed from tables and enhanced data parsed from the DSM-CC section. Herein, a table_id field, a section_number field, and a last_section_number field included in the table may be used to indicate whether the corresponding table is configured of a single section or a plurality of sections. For example, TS packets having the PID of the VCT are grouped to form a section, and sections having table identifiers allocated to the VCT are grouped to form the VCT.

When the VCT is parsed, information on the virtual channel to which enhanced data are transmitted may be obtained. The obtained application identification information, service component identification information, and service information corresponding to the data service may either be stored in the second memory 2011 or be outputted to the data broadcasting application manager 2013. In addition, reference may be made to the application identification information, service component identification information, and service information in order to decode the data service data. Alternatively, such information may also prepare the operation of the application program for the data service. Furthermore, the data decoder 2010 controls the demultiplexing of the system information table, which corresponds to the information table associated with the channel and events. Thereafter, an A.V PID list may be transmitted to the channel manager 2007.

The channel manager 2007 may refer to the channel map 2008 in order to transmit a request for receiving system-related information data to the data decoder 2010, thereby receiving the corresponding result. In addition, the channel manager 2007 may also control the channel tuning of the tuner 2001. Furthermore, the channel manager 2007 may directly control the demultiplexer 2003, so as to set up the A/V PID, thereby controlling the audio decoder 2004 and the video decoder 2005. The audio decoder 2004 and the video decoder 2005 may respectively decode and output the audio data and video data demultiplexed from the main data packet. Alternatively, the audio decoder 2004 and the video decoder 2005 may respectively decode and output the audio data and video data demultiplexed from the enhanced data packet. Meanwhile, when the enhanced data include data service data, and also audio data and video data, it is apparent that the audio data and video data demultiplexed by the demultiplexer 2003 are respectively decoded by the audio decoder 2004 and the video decoder 2005. For example, an audio-coding (AC)-3 decoding algorithm may be applied to the audio decoder 2004, and a MPEG-2 decoding algorithm may be applied to the video decoder 2005.

Meanwhile, the native TV application manager 2006 operates a native application program stored in the first memory 2009, thereby performing general functions such as channel change. The native application program refers to software stored in the receiving system upon shipping of the product. More specifically, when a user request (or command) is transmitted to the receiving system through a user interface (UI), the native TV application manger 2006 displays the user request on a screen through a graphic user interface (GUI), thereby responding to the user's request. The user interface receives the user request through an input device, such as a remote controller, a key pad, a jog controller, an a touch-screen provided on the screen, and then outputs the received user request to the native TV application manager 2006 and the data broadcasting application manager 2013. Furthermore, the native TV application manager 2006 controls the channel manager 2007, thereby controlling channel-associated, such as the management of the channel map 200B, and controlling the data decoder 2010. The native TV application manager 2006 also controls the GUI of the overall receiving system, thereby storing the user request and status of the receiving system in the first memory 2009 and restoring the stored information.

The channel manager 2007 controls the tuner 2001 and the data decoder 2010, so as to managing the channel map 2008 so that it can respond to the channel request made by the user.

More specifically, channel manager 2007 sends a request to the data decoder 2010 so that the tables associated with the channels that are to be tuned are parsed. The results of the parsed tables are reported to the channel manager 2007 by the data decoder 2010. Thereafter, based on the parsed results, the channel manager 2007 updates the channel map 2008 and sets up a PID in the demultiplexer 2003 for demultiplexing the tables associated with the data service data from the enhanced data.

The system manager 2012 controls the booting of the receiving system by turning the power on or off. Then, the system manager 2012 stores ROM images (including downloaded software images) in the first memory 2009. More specifically, the first memory 2009 stores management programs such as operating system (OS) programs required for managing the receiving system and also application program executing data service functions. The application program is a program processing the data service data stored in the second memory 2011 so as to provide the user with the data service. If the data service data are stored in the second memory 2011, the corresponding data service data are processed by the above-described application program or by other application programs, thereby being provided to the user. The management program and application program stored in the first memory 2009 may be updated or corrected to a newly downloaded program. Furthermore, the storage of the stored management program and application program is maintained without being deleted even if the power of the system is shut down. Therefore, when the power is supplied the programs may be executed without having to be newly downloaded once again.

The application program for providing data service according to the present invention may either be initially stored in the first memory 2009 upon the shipping of the receiving system, or be stored in the first 2009 after being downloaded. The application program for the data service (i.e., the data service providing application program) stored in the first memory 2009 may also be deleted, updated, and corrected. Furthermore, the data service providing application program may be downloaded and executed along with the data service data each time the data service data are being received.

When a data service request is transmitted through the user interface, the data broadcasting application manager 2013 operates the corresponding application program stored in the first memory 2009 so as to process the requested data, thereby providing the user with the requested data service. And, in order to provide such data service, the data broadcasting application manager 2013 supports the graphic user interface (GUI). Herein, the data service may be provided in the form of text (or short message service (SMS)), voice message, still image, and moving image. The data broadcasting application manager 2013 may be provided with a platform for executing the application program stored in the first memory 2009. The platform may be, for example, a Java virtual machine for executing the Java program. Hereinafter, an example of the data broadcasting application manager 2013 executing the data service providing application program stored in the first memory 2009, so as to process the data service data stored in the second memory 2011, thereby providing the user with the corresponding data service will now be described in detail.

Assuming that the data service corresponds to a traffic information service, the data service according to the present invention is provided to the user of a receiving system that is not equipped with an electronic map and/or a OPS system in the form of at least one of a text (or short message service (SMS)), a voice message, a graphic message, a still image, and a moving image. In this case, is a GPS module is mounted on the receiving system shown in FIG. 15, the GPS module receives satellite signals transmitted from a plurality of low earth orbit satellites and extracts the current position (or location) information (e.g., longitude, latitude, altitude), thereby outputting the extracted information to the data broadcasting application manager 2013.

At this point, it is assumed that the electronic map including information on each link and nod and other diverse graphic information are stored in one of the second memory 2011, the first memory 2009, and another memory that is not shown. More specifically, according to the request made by the data broadcasting application manager 2013, the data service data stored in the second memory 2011 are read and inputted to the data broadcasting application manager 2013. The data broadcasting application manager 2013 translates (or deciphers) the data service data read from the second memory 2011, thereby extracting the necessary information according to the contents of the message and/or a control signal.

Figure 16:
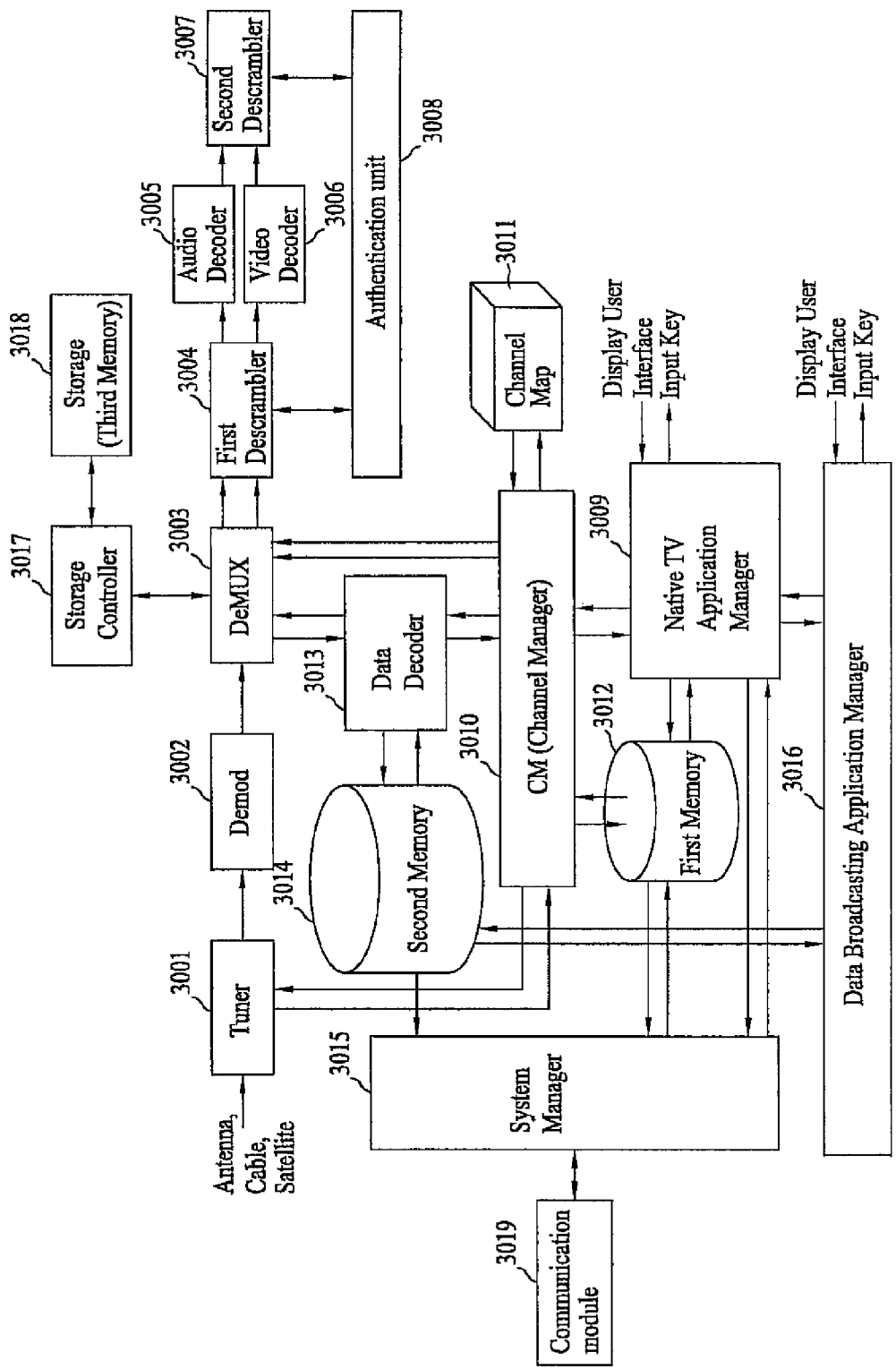
FIG. 16 illustrates a block diagram showing the structure of a digital broadcast (or television or DTV) receiving system according to another embodiment of the present invention.

FIG. 16 illustrates a block diagram showing the structure of a digital broadcast (or television) receiving system according to another embodiment of the present invention. Referring to FIG. 16, the digital broadcast receiving system includes a tuner 3001, a demodulating unit 3002, a demultiplexer 3003, a first descrambler 3004, an audio decoder 3005, a video decoder 3006, a second descrambler 3007, an authentication unit 3008, a native TV application manager 3009, a channel manager 3010, a channel map 3011, a first memory 3012, a data decoder 3013, a second memory 3014, a system manager 3015, a data broadcasting application manager 3016, a storage controller 3017, a third memory 3018, and a telecommunication module 3019. Herein, the third memory 3018 is a mass storage device, such as a hard disk drive (HDD) or a memory chip. Also, during the description of the digital broadcast (or television or DTV) receiving system shown in FIG. 16, the components that are identical to those of the digital broadcast receiving system of FIG. 15 will be omitted for simplicity.

As described above, in order to provide services for preventing illegal duplication (or copies) or illegal viewing of the enhanced data and/or main data that are transmitted by using a broadcast network, and to provide paid broadcast services, the transmitting system may generally scramble and transmit the broadcast contents. Therefore, the receiving system needs to descramble the scrambled broadcast contents in order to provide the user with the proper broadcast contents. Furthermore, the receiving system may generally be processed with an authentication process with an authentication means before the descrambling process. Hereinafter, the receiving system including an authentication means and a descrambling means according to an embodiment of the present invention will now be described in detail.

According to the present invention, the receiving system may be provided with a descrambling means receiving scrambled broadcasting contents and an authentication means authenticating (or verifying) whether the receiving system is entitled to receive the descrambled contents. Hereinafter, the descrambling means will be referred to as first and second descramblers 3004 and 3007, and the authentication means will be referred to as an authentication unit 3008. Such naming of the corresponding components is merely exemplary and is not limited to the terms suggested in the description of the present invention. For example, the units may also be referred to as a decryptor. Although FIG. 16 illustrates an example of the descramblers 3004 and 3007 and the authentication unit 3008 being provided inside the receiving system, each of the descramblers 3004 and 3007 and the authentication unit 3008 may also be separately provided in an internal or external module. Herein, the module may include a slot type, such as a SD or CF memory, a memory stick type, a USB type, and so on, and may be detachably fixed to the receiving system.

As described above, when the authentication process is performed successfully by the authentication unit 3008, the scrambled broadcasting contents are descrambled by the descramblers 3004 and 3007, thereby being provided to the user. At this point, a variety of the authentication method and descrambling method may be used herein. However, an agreement on each corresponding method should be made between the receiving system and the transmitting system. Hereinafter, the authentication and descrambling methods will now be described, and the description of identical components or process steps will be omitted for simplicity.

The receiving system including the authentication unit 3008 and the descramblers 3004 and 3007 will now be described in detail. The receiving system receives the scrambled broadcasting contents through the tuner 3001 and the demodulating unit 3002. Then, the system manager 3015 decides whether the received broadcasting contents have been scrambled. Herein, the demodulating unit 3002 may be included as a demodulating means according to embodiments of the present invention as described in FIG. 4 and FIG. 14. However, the present invention is not limited to the examples given in the description set forth herein. If the system manager 3015 decides that the received broadcasting contents have been scrambled, then the system manager 3015 controls the system to operate the authentication unit 3008. As described above, the authentication unit 3008 performs an authentication process in order to decide whether the receiving system according to the present invention corresponds to a legitimate host entitled to receive the paid broadcasting service. Herein, the authentication process may vary in accordance with the authentication methods.

For example, the authentication unit 3008 may perform the authentication process by comparing an IP address of an IP datagram within the received broadcasting contents with a specific address of a corresponding host. At this point, the specific address of the corresponding receiving system (or host) may be a MAC address. More specifically, the authentication unit 3008 may extract the IP address from the decapsulated IP datagram, thereby obtaining the receiving system information that is mapped with the IP address. At this point, the receiving system should be provided, in advance, with information (e.g., a table format) that can map the IP address and the receiving system information. Accordingly, the authentication unit 3008 performs the authentication process by determining the conformity between the address of the corresponding receiving system and the system information of the receiving system that is mapped with the IP address. In other words, if the authentication unit 3008 determines that the two types of information conform to one another, then the authentication unit 3008 determines that the receiving system is entitled to receive the corresponding broadcasting contents.

In another example, standardized identification information is defined in advance by the receiving system and the transmitting system. Then, the identification information of the receiving system requesting the paid broadcasting service is transmitted by the transmitting system. Thereafter, the receiving system determines whether the received identification information conforms with its own unique identification number, so as to perform the authentication process. More specifically, the transmitting system creates a database for storing the identification information (or number) of the receiving system requesting the paid broadcasting service.

Then, if the corresponding broadcasting contents are scrambled, the transmitting system includes the identification information in the EMM, which is then transmitted to the receiving system.

If the corresponding broadcasting contents are scrambled, messages (e.g., entitlement control message (ECM), entitlement management message (EMM)), such as the CAS information, mode information, message position information, that are applied to the scrambling of the broadcasting contents are transmitted through a corresponding data header or anther data packet. The ECM may include a control word (CW) used for scrambling the broadcasting contents. At this point, the control word may be encoded with an authentication key. The EMM may include an authentication key and entitlement information of the corresponding data. Herein, the authentication key may be encoded with a receiving system-specific distribution key. In other words, assuming that the enhanced data are scrambled by using the control word, and that the authentication information and the descrambling information are transmitted from the transmitting system, the transmitting system encodes the CW with the authentication key and, then, includes the encoded CW in the entitlement control message (ECM), which is then transmitted to the receiving system. Furthermore, the transmitting system includes the authentication key used for encoding the CW and the entitlement to receive data (or services) of the receiving system (i.e., a standardized serial number of the receiving system that is entitled to receive the corresponding broadcasting service or data) in the entitlement management message (EMM), which is then transmitted to the receiving system.

Accordingly, the authentication unit 3008 of the receiving system extracts the identification information of the receiving system and the identification information included in the EMM of the broadcasting service that is being received. Then, the authentication unit 300B determines whether the identification information conform to each other, so as to perform the authentication process. More specifically, if the authentication unit 3008 determines that the information conform to each other, then the authentication unit 3008 eventually determines that the receiving system is entitled to receive the request broadcasting service.

In yet another example, the authentication unit 3008 of the receiving system may be detachably fixed to an external module. In this case, the receiving system is interfaced with the external module through a common interface (CI). In other words, the external module may receive the data scrambled by the receiving system through the common interface, thereby performing the descrambling process of the received data. Alternatively, the external module may also transmit only the information required for the descrambling process to the receiving system. The common interface is configured on a physical layer and at least one protocol layer. Herein, in consideration of any possible expansion of the protocol layer in a later process, the corresponding protocol layer may be configured to have at least one layer that can each provide an independent function.

The external module may either consist of a memory or card having information on the key used for the scrambling process and other authentication information but not including any descrambling function, or consist of a card having the above-mentioned key information and authentication information and including the descrambling function. Both the receiving system and the external module should be authenticated in order to provide the user with the paid broadcasting service provided (or transmitted) from the transmitting system. Therefore, the transmitting system can only provide the corresponding paid broadcasting service to the authenticated pair of receiving system and external module.

Additionally, an authentication process should also be performed between the receiving system and the external module through the common interface. More specifically, the module may communicate with the system manager 3015 included in the receiving system through the common interface, thereby authenticating the receiving system. Alternatively, the receiving system may authenticate the module through the common interface. Furthermore, during the authentication process, the module may extract the unique ID of the receiving system and its own unique ID and transmit the extracted IDs to the transmitting system. Thus, the transmitting system may use the transmitted ID values as information determining whether to start the requested service or as payment information. Whenever necessary, the system manager 3015 transmits the payment information to the remote transmitting system through the telecommunication module 3019.

The authentication unit 300B authenticates the corresponding receiving system and/or the external module. Then, if the authentication process is successfully completed, the authentication unit 3008 certifies the corresponding receiving system and/or the external module as a legitimate system and/or module entitled to receive the requested paid broadcasting service. In addition, the authentication unit 3008 may also receive authentication-associated information from a mobile telecommunications service provider to which the user of the receiving system is subscribed, instead of the transmitting system providing the requested broadcasting service. In this case, the authentication-association information may either be scrambled by the transmitting system providing the broadcasting service and, then, transmitted to the user through the mobile telecommunications service provider, or be directly scrambled and transmitted by the mobile telecommunications service provider. Once the authentication process is successfully completed by the authentication unit 3008, the receiving system may descramble the scrambled broadcasting contents received from the transmitting system. At this point, the descrambling process is performed by the first and second descramblers 3004 and 3007. Herein, the first and second descramblers 3004 and 3007 may be included in an internal module or an external module of the receiving system.

The receiving system is also provided with a common interface for communicating with the external module including the first and second descramblers 3004 and 3007, so as to perform the descrambling process. More specifically, the first and second descramblers 3004 and 3007 may be included in the module or in the receiving system in the form of hardware, middleware or software. Herein, the descramblers 3004 and 3007 may be included in any one of or both of the module and the receiving system. If the first and second descramblers 3004 and 3007 are provided inside the receiving system, it is advantageous to have the transmitting system (i.e., at least any one of a service provider and a broadcast station) scramble the corresponding data using the same scrambling method.

Alternatively, if the first and second descramblers 3004 and 3007 are provided in the external module, it is advantageous to have each transmitting system scramble the corresponding data using different scrambling methods. In this case, the receiving system is not required to be provided with the descrambling algorithm corresponding to each transmitting system. Therefore, the structure and size of receiving system may be simplified and more compact. Accordingly, in this case, the external module itself may be able to provide CA functions, which are uniquely and only provided by each transmitting systems, and functions related to each service that is to be provided to the user. The common interface enables the various external modules and the system manager 3015, which is included in the receiving system, to communicate with one another by a single communication method. Furthermore, since the receiving system may be operated by being connected with at least one or more modules providing different services, the receiving system may be connected to a plurality of modules and controllers.

In order to maintain successful communication between the receiving system and the external module, the common interface protocol includes a function of periodically checking the status of the opposite correspondent. By using this function, the receiving system and the external module is capable of managing the status of each opposite correspondent. This function also reports the user or the transmitting system of any malfunction that may occur in any one of the receiving system and the external module and attempts the recovery of the malfunction.

In yet another example, the authentication process may be performed through software. More specifically, when a memory card having CAS software downloaded, for example, and stored therein in advanced is inserted in the receiving system, the receiving system receives and loads the CAS software from the memory card so as to perform the authentication process. In this example, the CAS software is read out from the memory card and stored in the first memory 3012 of the receiving system. Thereafter, the CAS software is operated in the receiving system as an application program. According to an embodiment of the present invention, the CAS software is mounted on (or stored) in a middleware platform and, then executed. A Java middleware will be given as an example of the middleware included in the present invention. Herein, the CAS software should at least include information required for the authentication process and also information required for the descrambling process.

Therefore, the authentication unit 3008 performs authentication processes between the transmitting system and the receiving system and also between the receiving system and the memory card. At this point, as described above, the memory card should be entitled to receive the corresponding data and should include information on a normal receiving system that can be authenticated. For example, information on the receiving system may include a unique number, such as a standardized serial number of the corresponding receiving system. Accordingly, the authentication unit 3008 compares the standardized serial number included in the memory card with the unique information of the receiving system, thereby performing the authentication process between the receiving system and the memory card.

If the CAS software is first executed in the Java middleware base, then the authentication between the receiving system and the memory card is performed. For example, when the unique number of the receiving system stored in the memory card conforms to the unique number of the receiving system read from the system manager 3015, then the memory card is verified and determined to be a normal memory card that may be used in the receiving system. At this point, the CAS software may either be installed in the first memory 3012 upon the shipping of the present invention, or be downloaded to the first memory 3012 from the transmitting system or the module or memory card, as described above. Herein, the descrambling function may be operated by the data broadcasting application manger 3016 as an application program.

Thereafter, the CAS software parses the EMM/ECM packets outputted from the demultiplexer 3003, so as to verify whether the receiving system is entitled to receive the corresponding data, thereby obtaining the information required for descrambling (i.e., the CW) and providing the obtained CW to the descramblers 3004 and 3007. More specifically, the CAS software operating in the Java middleware platform first reads out the unique (or serial) number of the receiving system from the corresponding receiving system and compares it with the unique number of the receiving system transmitted through the EMM, thereby verifying whether the receiving system is entitled to receive the corresponding data. Once the receiving entitlement of the receiving system is verified, the corresponding broadcasting service information transmitted to the ECM and the entitlement of receiving the corresponding broadcasting service are used to verify whether the receiving system is entitled to receive the corresponding broadcasting service. Once the receiving system is verified to be entitled to receive the corresponding broadcasting service, the authentication key transmitted to the EMM is used to decode (or decipher) the encoded CW, which is transmitted to the ECM, thereby transmitting the decoded CW to the descramblers 3004 and 3007. Each of the descramblers 3004 and 3007 uses the CW to descramble the broadcasting service.

Meanwhile, the CAS software stored in the memory card may be expanded in accordance with the paid service which the broadcast station is to provide. Additionally, the CAS software may also include other additional information other than the information associated with the authentication and descrambling. Furthermore, the receiving system may download the CAS software from the transmitting system so as to upgrade (or update) the CAS software originally stored in the memory card. As described above, regardless of the type of broadcast receiving system, as long as an external memory interface is provided, the present invention may embody a CAS system that can meet the requirements of all types of memory card that may be detachably fixed to the receiving system. Thus, the present invention may realize maximum performance of the receiving system with minimum fabrication cost, wherein the receiving system may receive paid broadcasting contents such as broadcast programs, thereby acknowledging and regarding the variety of the receiving system. Moreover, since only the minimum application program interface is required to be embodied in the embodiment of the present invention, the fabrication cost may be minimized, thereby eliminating the manufacturer's dependence on CAS manufacturers. Accordingly, fabrication costs of CAS equipments and management systems may also be minimized.

Meanwhile, the descramblers 3004 and 3007 may be included in the module either in the form of hardware or in the form of software. In this case, the scrambled data that being received are descrambled by the module and then demodulated. Also, if the scrambled data that are being received are stored in the third memory 3018, the received data may be descrambled and then stored, or stored in the memory at the point of being received and then descrambled later on prior to being played (or reproduced). Thereafter, in case scramble/descramble algorithms are provided in the storage controller 3017, the storage controller 3017 scrambles the data that are being received once again and then stores the re-scrambled data to the third memory 3018.

In yet another example, the descrambled broadcasting contents (transmission of which being restricted) are transmitted through the broadcasting network. Also, information associated with the authentication and descrambling of data in order to disable the receiving restrictions of the corresponding data are transmitted and/or received through the telecommunications module 3019. Thus, the receiving system is able to perform reciprocal (or two-way) communication. The receiving system may either transmit data to the telecommunication module within the transmitting system or be provided with the data from the telecommunication module within the transmitting system. Herein, the data correspond to broadcasting data that are desired to be transmitted to or from the transmitting system, and also unique information (i.e., identification information) such as a serial number of the receiving system or MAC address.

The telecommunication module 3019 included in the receiving system provides a protocol required for performing reciprocal (or two-way) communication between the receiving system, which does not support the reciprocal communication function, and the telecommunication module included in the transmitting system. Furthermore, the receiving system configures a protocol data unit (PDU) using a tag-length-value (TLV) coding method including the data that are to be transmitted and the unique information (or ID information). Herein, the tag field includes indexing of the corresponding PDU. The length field includes the length of the value field. And, the value field includes the actual data that are to be transmitted and the unique number (e.g., identification number) of the receiving system.

The receiving system may configure a platform that is equipped with the Java platform and that is operated after downloading the Java application of the transmitting system to the receiving system through the network. In this case, a structure of downloading the PDU including the tag field arbitrarily defined by the transmitting system from a storage means included in the receiving system and then transmitting the downloaded PDU to the telecommunication module 3019 may also be configured. Also, the PDU may be configured in the Java application of the receiving system and then outputted to the telecommunication module 3019. The PDU may also be configured by transmitting the tag value, the actual data that are to be transmitted, the unique information of the corresponding receiving system from the Java application and by performing the TLV coding process in the receiving system. This structure is advantageous in that the firmware of the receiving system is not required to be changed even if the data (or application) desired by the transmitting system is added.

The telecommunication module within the transmitting system either transmits the PDU received from the receiving system through a wireless data network or configures the data received through the network into a PDU which is transmitted to the host. At this point, when configuring the PDU that is to be transmitted to the host, the telecommunication module within the transmitting end may include unique information (e.g., IP address) of the transmitting system which is located in a remote location. Additionally, in receiving and transmitting data through the wireless data network, the receiving system may be provided with a common interface, and also provided with a WAP, CDMA 1× EV-DO, which can be connected through a mobile telecommunication base station, such as CDMA and GSM, and also provided with a wireless LAN, mobile internet, WiBro, WiMax, which can be connected through an access point. The above-described receiving system corresponds to the system that is not equipped with a telecommunication function. However, a receiving system equipped with telecommunication function does not require the telecommunication module 3019.

The broadcasting data being transmitted and received through the above-described wireless data network may include data required for performing the function of limiting data reception. Meanwhile, the demultiplexer 3003 receives either the real-time data outputted from the demodulating unit 3002 or the data read from the third memory 3018, thereby performing demultiplexing. In this embodiment of the present invention, the demultiplexer 3003 performs demultiplexing on the enhanced data packet. Similar process steps have already been described earlier in the description of the present invention. Therefore, a detailed of the process of demultiplexing the enhanced data will be omitted for simplicity.

The first descrambler 3004 receives the demultiplexed signals from the demultiplexer 3003 and then descrambles the received signals. At this point, the first descrambler 3004 may receive the authentication result received from the authentication unit 3008 and other data required for the descrambling process, so as to perform the descrambling process. The audio decoder 3005 and the video decoder 3006 receive the signals descrambled by the first descrambler 3004, which are then decoded and outputted. Alternatively, if the first descrambler 3004 did not perform the descrambling process, then the audio decoder 3005 and the video decoder 3006 directly decode and output the received signals. In this case, the decoded signals are received and then descrambled by the second descrambler 3007 and processed accordingly.

As described in the first embodiment of the present invention, in the method of detecting the timing error at the peak of the correlation values between the known data of the time domain and the received signals, if the received signals experience a multiple path channel due to a time delay, the form (or shape) of the correlation values may be largely affected by the channel. On the other hand, in the method of detecting the timing error by using the correlation values between the previously received known data and the currently received known data, the influence of the channel may be largely reduced. Furthermore, in the method of detecting the timing error according to the first and second embodiments of the present invention, the timing error detection may be performed by using all of the known data sequence inserted by the transmitting system. Alternatively, in order to eliminate (or remove) the influence of the multiple path channel caused by time delay, only a portion of the known data sequence, which is less affected (or influenced) by the random data of the channel, may be used to perform the timing error detection process.

As described above, the digital broadcasting receiving system and method according to the present invention has the following advantages. More specifically, the digital broadcasting receiving system and method according to the present invention is highly protected against (or resistant to) any error that may occur when transmitting supplemental data through a channel. And, the present invention is also highly compatible to the conventional receiving system. Moreover, the present invention may also receive the supplemental data without any error even in channels having severe ghost effect and noise.

Additionally, by inserting known data in a specific place (or position) of the data domain and transmitting the processed data, and by using the inserted known data for timing clock recovery, the receiving performance of the digital broadcast (or digital television) receiving system liable to a frequent change in channel may be enhanced. Furthermore, the present invention is even more effective when applied to mobile and portable receiving systems, which are also liable to a frequent change in channel and which require protection (or resistance) against intense noise.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A data, and processing method of a digital receiving system, comprising:
    receiving a broadcast signal in which known data symbol sequences being training sequences, main data being video and audio data for a first service and enhanced data being video and audio data for a second service are interleaved,
    wherein the digital broadcast signal includes data groups, wherein at least one of the data groups includes first, second and third regions, wherein the second region is located between the first and third regions, wherein the second region includes the enhanced data and the known data symbol sequences, and wherein the first and third regions include the enhanced data and the main data,
    wherein at least two of the known data symbol sequences are regularly spaced in the second region and at least one known data symbol sequence has a repeated pattern;
    detecting a timing error of the received broadcast signal;
    creating a timing clock based on the detected timing error, and re-sampling the received broadcast signal based on the timing clock;
    performing channel equalization on the received broadcast signal using at least one of the known data symbol sequences in the received broadcast signal;
    building a two-dimensional Reed-Solomon (RS) frame using the enhanced data in the equalized broadcast signal, the two-dimensional RS frame including cyclic redundancy check (CRC) error flags in each row of the RS frame and RS parity bytes in each column of the RS frame;
    checking the CRC error flags corresponding to each row of the two-dimensional RS frame; and
    performing RS erasure decoding for the two-dimensional RS frame column by column using the checked CRC error flags.

2. The method of claim 1, wherein the step of detecting the timing error comprises:
    calculating correlation values between the known data symbol sequences and the received broadcast signal in a time domain; and
    detecting the timing error from the correlation values.

3. The method of claim 1, wherein the step of detecting the timing error comprises:
    calculating correlation values between the known data symbol sequences and the received broadcast signal; and
    with respect to a correlation peak, calculating a difference between a correlation value before the correlation peak and a correlation value after the correlation peak, and detecting the timing error using the calculated difference.

4. The method of claim 1, wherein the step of detecting the timing error comprises:
    calculating correlation values between one of a plurality of sections divided in each of the known data symbol sequences and the received broadcast signal; and
    with respect to a correlation peak of one of the plurality of sections, calculating a difference between a correlation value before the correlation peak and a correlation value after the correlation peak, and detecting the timing error using the calculated difference.

5. The method of claim 1, wherein the step of detecting the timing error comprises:

calculating correlation values between one of a plurality of sections divided in each of the known data symbol sequences and the received broadcast signal;

adding the calculated correlation values corresponding to the plurality of sections; and with respect to a total correlation peak of the added correlation values, calculating a difference between a correlation value before the total correlation peak and a correlation value after the total correlation peak, and detecting the timing error using the calculated difference.

6. The method of claim 1, wherein, the step of detecting the timing error comprises:

calculating correlation values between a first known data symbol sequence and a second known data symbol sequence following the first known data symbol sequence in a frequency domain; and detecting the timing error using the calculated correlation values.

7. The method of claim 1, wherein the step of detecting the timing error comprises:

converting a currently received known data symbol sequence to frequency domain signals;

converting a previously received known data symbol sequence to frequency domain signals;

multiplying values of complex conjugates of the frequency domain signals corresponding to the previously received known data symbol sequence and the frequency domain signals corresponding to the currently received known data symbol sequence;

calculating phase gradients of the multiplied values; and detecting the timing error using the calculated phase gradients.

8. The method of claim 7, wherein the step of detecting the timing error further comprises:

dividing the multiplied values into a first domain and a second domain, wherein the first domain includes correlation values and the second domain does not include any correlation value;

dividing the first domain into two sub-domains; and adding phases of the multiplied values within each of the two sub-domains, and calculating the phase gradients using difference values between the added phases within the two sub-domains.

9. A digital receiving system for processing a digital broadcast signal, the digital receiving system comprising:

a tuner for receiving the digital broadcast signal in which known data symbol sequences being training sequences, main data being video and audio data for a first service and enhanced data being video and audio data for a second service are interleaved, wherein the digital broadcast signal includes data groups, wherein at least one of the data groups includes first, second and third regions, wherein the second region is located between the first and third regions, wherein the second region includes the enhanced data and the known data symbol sequences, and wherein the first and third regions include the enhanced data and the main data, and wherein at least two of the known data symbol sequences are regularly spaced in the second region and at least one known data symbol sequence has a repeated pattern;

a demodulator for demodulating the received broadcast signal and performing time recovery of the received broadcast signal;

an equalizer for performing channel equalization on the demodulated broadcast signal using at least one of the known data symbol sequences in the demodulated broadcast signal; and a Reed-Solomon (RS) frame decoder for building a two-dimensional RS frame using the enhanced data in the channel-equalized broadcast signal, the two-dimensional RS frame including cyclic redundancy check (CRC) error flags in each row of the RS frame and RS parity bytes in each column of the RS frame, checking the CRC error flags corresponding to each row of the two-dimensional RS frame and performing RS erasure decoding for the two-dimensional RS frame column by column using the checked CRC error flags.

10. A method for processing a digital broadcast signal, the method comprising:

receiving the digital broadcast signal in which known data symbol sequences being training sequences, main data being video and audio data for a first service and enhanced data being video and audio data for a second service are interleaved, wherein the digital broadcast signal includes data groups, wherein at least one of the data groups includes first, second and third regions, wherein the second region is located between the first and third regions, wherein the second region includes the enhanced data and the known data symbol sequences, and wherein the first and third regions include the enhanced data and the main data, and wherein at least two of the known data symbol sequences are regularly spaced in the second region and at least one known data symbol sequence has a repeated pattern;

demodulating the received broadcast signal and performing time recovery of the received broadcast signal;

performing channel equalization on the demodulated broadcast signal using at least one of the known data symbol sequences in the demodulated broadcast signal;

building a two-dimensional Reed-Solomon (RS) frame using the enhanced data in the channel-equalized broadcast signal, the two-dimensional RS frame including cyclic redundancy check (CRC) error flags in each row of the RS frame and RS parity bytes in each column of the RS frame;

checking the CRC error flags corresponding to each row of the two-dimensional RS frame; and performing RS erasure decoding for the two-dimensional RS frame column by column using the checked CRC error flags.

* * * * *